US008582673B2

(12) United States Patent
Hao et al.

(10) Patent No.: US 8,582,673 B2
(45) Date of Patent: *Nov. 12, 2013

(54) METHOD FOR MAPPING PHYSICAL RANDOM ACCESS CHANNELS

(75) Inventors: Peng Hao, Shenzhen (CN); Shuqiang Xia, Shenzhen (CN); Chunli Liang, Shenzhen (CN); Bo Dai, Shenzhen (CN); Bin Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 383 days.

This patent is subject to a terminal disclaimer.

(21) Appl. No.: 12/922,845

(22) PCT Filed: Feb. 12, 2009

(86) PCT No.: PCT/CN2009/070413
§ 371 (c)(1),
(2), (4) Date: Sep. 15, 2010

(87) PCT Pub. No.: WO2009/117909
PCT Pub. Date: Oct. 1, 2009

(65) Prior Publication Data
US 2011/0019752 A1    Jan. 27, 2011

(30) Foreign Application Priority Data
Mar. 26, 2008    (CN) .......................... 2008 1 0065888

(51) Int. Cl.
*H04K 1/10*    (2006.01)
(52) U.S. Cl.
USPC ........... 375/260; 375/259; 375/295; 370/330; 370/343; 370/345; 370/436
(58) Field of Classification Search
USPC .......... 375/259, 260, 295; 370/330, 343, 345, 370/436
See application file for complete search history.

(56) References Cited

U.S. PATENT DOCUMENTS

2002/0041578 A1*  4/2002  Kim et al. ..................... 370/335
2008/0267161 A1* 10/2008  Bertrand et al. ............. 370/347

FOREIGN PATENT DOCUMENTS

| CN | 101005308 A | 7/2007 |
|----|-------------|--------|
| CN | 101128028 A | 2/2008 |
| CN | 101179364 A | 5/2008 |
| CN | 101252386 A | 8/2008 |
| WO | 2007145555 A1 | 12/2007 |

OTHER PUBLICATIONS

International Search Report and Written Opinion for International Application No. PCT/CN2009/070413, dated Apr. 30, 2009.

* cited by examiner

*Primary Examiner* — Leon Flores
(74) *Attorney, Agent, or Firm* — Bright IP Law Offices

(57) ABSTRACT

A method for mapping physical random access channel (PRACHs) is provided in the present invention, wherein W PRACHs have the same time domain location and the serial number of each PRACH is w=0, 1, 2, . . . , W−1. The method includes: mapping the PRACHs with the odd w numbers from high frequency to low frequency, or from low frequency to high frequency in a usable frequency band, mapping the PRACHs with the even w numbers from low frequency to high frequency, or from high frequency to low frequency in the usable frequency band. One PRACH occupies 6 continuous resource blocks in the frequency domain, and the frequency bands occupied by the two adjacent PRACHs in the frequency domain do not overlap, furthermore the same mapping process is used for each version number r. The PRACHs which need to be processed by the same station could be distributed evenly in the time domain, and at the same time the inter-cell interference of the second type PRACH could be reduced to the greatest extent through the present invention.

3 Claims, 5 Drawing Sheets

METHOD FOR MAPPING PHYSICAL RANDOM ACCESS CHANNELS

FIELD OF THE INVENTION

The present invention relates to communication field, in particular to a method for mapping physical random access channels.

BACKGROUND OF THE INVENTION

FIG. 1 is a schematic diagram of the frame structure of time division duplex (TDD for short) mode in the LTE system. As shown in FIG. 1, in such a frame structure, a 10 ms (307200 Ts, 1 ms=30720 Ts) radio frame is divided into two half-frames, each of which is 5 ms (153600 Ts) long and comprises 8 normal time slots with a length of 0.5 ms and 3 special time slots, i.e., a downlink pilot time slot (DwPTS for short), a guard period (GP for short) and an uplink pilot time slot (UpPTS for short), and the total length of these 3 special time slots is 1 ms (30720 Ts). Subframe 1 is always consisted of 3 special time slots; when there are 2 downlink-to-uplink conversion points in 10 ms, subframe 6 is consisted of 3 special time slots; in other cases, subframe 6 only comprises a DwPTS (the length of the DwPTS is 1 ms at this time), and other subframes are consisted of 2 normal time slots.

In the above frame structure, subframes 0, 5 and the DwPTS are used for downlink transmission, subframe 2 and the UpPTS are used for uplink transmission. When there are 2 downlink-to-uplink conversion points in 10 ms, subframe 7 is also used for uplink transmission.

In the TDD mode in the LTE system, physical random access channel (PRACH for short) can be classified into two types:

The first type is transmitted in general uplink subframes (not including subframes of special time slots), and comprises 4 kinds of PRACHs as listed below:

(1) Preamble format 0: occupying 1 uplink subframe, the length of the cyclic prefix (CP) being 3168 Ts, and the length of the preamble being 23576 Ts;

(2) Preamble format 1: occupying 2 uplink subframes, the length of the cyclic prefix (CP) being 21024 Ts, and the length of the preamble being 24576 Ts;

(3) Preamble format 2: occupying 2 uplink subframes, the length of the cyclic prefix (CP) being 6240 Ts, and the length of the preamble being 2×24576 Ts;

(4) Preamble format 3: occupying 3 uplink subframes, the length of the cyclic prefix (CP) being 21024 Ts, and the length of the preamble being 2×24576 Ts;

The second type is transmitted in the UpPTS and comprises one kind of PRACH, Preamble format 4, of which the length of the CP is 448 Ts and the length of the preamble is 4096 Ts;

In the frequency domain, all of the various PRACHs mentioned above occupy 6 resource blocks (RB), each RB comprises 12 sub-carriers, and each sub-carrier has a bandwidth of 15 kHz.

Upon accessing a system, a mobile phone needs to perform downlink synchronization, then demodulate the broadcast channel to obtain the configuration parameters of the PRACH, finally perform uplink synchronization through the PRACH, and establish a link to the base station. Herein, the configuration parameters of the PRACH in the TDD mode comprises density (how many PRACHs are usable in a unit of time, for example, D=2 PRACHs/10 ms, which means that there are 2 PRACHs usable in 10 ms), preamble format, version number.

Wherein same format, density with different version number means that preamble formats are the same, the numbers of PRACHs in a unit of time are the same, but the locations of these PRACHs in the frequency domain or time domain are different. The purpose that a plurality of versions are set for the PRACHs of the same format and same density and different cells use different versions is to scatter the PRACHs of different cells managed by the same base station in the time domain, so as to make individual cells managed by the same base station request for processing PRACHs at different time as much as possible, thus avoid the case that the base station is over busy at some time but has no data to process at other time. In addition, for the PRACH of preamble format 4, since no data is sent in the UpPTS, different cells use different versions, the PRACH of each cell has different time domain or frequency domain location, which can reduce the inter-cell interference of the PRACH.

During the process of uplink synchronization, the mobile phone obtains the time domain locations and the frequency domain locations of the PRACHs usable for the present cell using the PRACH configuration parameters by a certain algorithm. In the prior art, no reasonable mapping algorithm for the time domain location and the frequency domain location is provided, which results in problems that the PRACHs which need to be processed by the same base station are distributed unevenly in the time domain, and inter-cell interference of the PRACH of the second type is comparatively severe.

SUMMARY OF THE INVENTION

The present invention is proposed in consideration that there is no reasonable mapping algorithm for the frequency domain location in the prior art, which results in the problem that the PRACHs which need to be processed by the same base station are distributed unevenly in the time domain, and the inter-cell interference of the second type of the PRACH is comparatively severe. The present invention aims at providing a mapping method for the PRACHs to solve at least one of the above problems.

According to the present invention, a method for mapping PRACHs is provided, which is applied to W PRACHs of the same time domain location, wherein the serial number of each PRACH is w=0, 1, 2, ..., W−1.

In the above mapping method, the PRACHs with even serial numbers are mapped from high (or low) frequency to low (or high) frequency in a usable frequency band, while the PRACHs with odd serial numbers are mapped from low (or high) frequency to high (or low) frequency in the usable frequency bands, and one PRACH occupies 6 continuous RBs in the frequency domain, the frequency bands occupied by two adjacent PRACHs in the frequency domain do not overlap. Furthermore the same mapping process is used for each version number r; or the first half $$\left(w \leq \left\lceil \frac{W}{2} \right\rceil, \text{ or } w < \left\lceil \frac{W}{2} \right\rceil, \text{ or } w \leq \left\lfloor \frac{W}{2} \right\rfloor, \text{ or } w < \left\lfloor \frac{W}{2} \right\rfloor\right)$$

of the PRACHs are mapped from high (or low) frequency to low (or high) frequency in a usable frequency band, while the second half of the PRACHs are mapped from low (or high) frequency to high (or low) frequency in the usable frequency band, and one PRACH occupies 6 continuous RBs in the frequency domain, the frequency bands occupied by two adjacent PRACHs in the frequency domain do not overlap.

The same mapping process is used for each version number r; or the PRACHs with even serial numbers are mapped from high (or low) frequency to low (or high) frequency in a usable frequency band, while the PRACHs with odd serial numbers are mapped from low (or high) frequency to high (or low) frequency in the usable frequency band, and one PRACH occupies 6 continuous RBs in the frequency domain, the frequency bands occupied by two adjacent PRACHs in the frequency domain do not overlap; or the first half $$\left(w \leq \left\lceil \frac{W}{2} \right\rceil, \text{ or } w < \left\lceil \frac{W}{2} \right\rceil, \text{ or } w \leq \left\lfloor \frac{W}{2} \right\rfloor, \text{ or } w < \left\lfloor \frac{W}{2} \right\rfloor \right)$$

of the PRACHs are mapped from high (or low) frequency to low (or high) frequency in a usable frequency band, while the second half of the PRACHs are mapped from low (or high) frequency to high (or low) frequency in the usable frequency band, and one PRACH occupies 6 continuous RBs in the frequency domain, the frequency bands occupied by two adjacent PRACHs in the frequency domain do not overlap.

In the above mapping method, the version number r is obtained through the process as following: obtaining the version number directly from the configuration type of the PRACH sent from a base station.

For the PRACHs with the format of preamble formats 0~3, the mapping formula for the mapping process in the frequency domain is:

$$k_{RA} = \begin{cases} k'_{RA} + 6 \left\lfloor \dfrac{f^r_{LRA}(t^0_{RA}, t^1_{RA}, t^2_{RA})}{2} \right\rfloor, & f^r_{LRA}(t^0_{RA}, t^1_{RA}, t^2_{RA}) \bmod 2 = 0 \\ N^{UL}_{RB} - 6 - k'_{RA} - 6 \left\lfloor \dfrac{f^r_{LRA}(t^0_{RA}, t^1_{RA}, t^2_{RA})}{2} \right\rfloor, & \text{otherwise} \end{cases}$$

Wherein $k'_{RA}$ denotes the serial number of the first RB usable for the PRACH of low frequency, $N_{RB}^{UL}$ denotes the total number of RBs corresponding to uplink bandwidth, $f_{LRA}{}^r(t_{RA}{}^0, t_{RA}{}^1, t_{RA}{}^2)$ denotes the frequency domain mapping index of preamble formats 0~3, i.e., the serial numbers of all PRACHs belonging to the same cell, with the version number r and the same time domain location which is determined by parameters $(t_{RA}{}^0, t_{RA}{}^1, t_{RA}{}^2)$, wherein $t_{RA}{}^0$ is used to indicate in which radio frame the PRACH resides; $t_{RA}{}^1$ is used to indicate in which half frame the PRACH resides; $t_{RA}{}^2$ is used to indicate in which subframe in the half frame the PRACH resides.

The method for mapping PRACHs of the above embodiment takes the factor of version number into account during a mapping process, thus it solves problems such as the PRACHs which need to be processed by the same base station are distributed unevenly in the time domain, and enable the PRACHs which need to be processed by the same domain to be distributed evenly, and reduce the inter-cell interference of the second type PRACH to the greatest extent.

BRIEF DESCRIPTION OF THE DRAWINGS

The drawings are provided herein for the further understanding of the present invention, and form a part of the present application, and the exemplary embodiments and the description are used to explain the present invention, which does not form an undue limitation to the present invention, wherein.

DETAILED DESCRIPTION OF THE EMBODIMENTS

Function Summary

Figure 1:
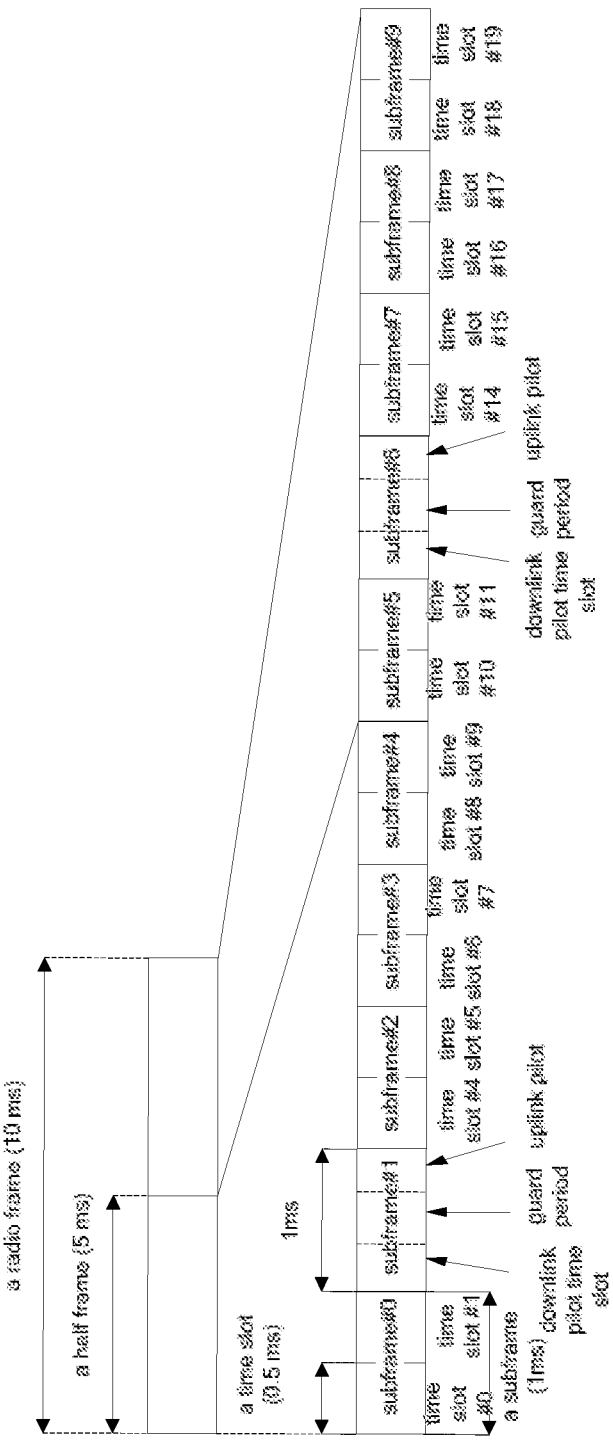
FIG. 1 shows the frame structure of the TDD mode in the LTE system.

In the technical methods provided by the embodiments of the present invention, for W PRACHs having the same time domain location, wherein the serial number of each PRACH is w=0, 1, 2, . . . , W−1, the PRACHs with even serial numbers can be mapped from high frequency to low frequency, or from low frequency to high frequency in a usable frequency band, while the PRACHs with odd serial numbers can be mapped from low frequency to high frequency, or from high frequency to low frequency in the usable frequency band, and one PRACH occupies 6 RBs (the 6 RBs related in the embodiments of the present invention refer to 6 continuous RBs in the frequency domain), the frequency bands occupied by two adjacent PRACHs in the frequency domain do not overlap, and the same mapping process is used for each version number r.

By referring to drawings and in connection with embodiments, the present invention will be described in detail. It needs to be explained that, if not contradictory, the embodiments of the present application and the features of the embodiments can be combined with one another.

The method for mapping PRACHs according to embodiments of the present invention is applied to W PRACHs having the same time domain location, wherein the serial number of each PRACH is w=0, 1, 2, . . . , W−1, and comprises the following steps:

the PRACHs with even serial numbers are mapped from high frequency to low frequency, or from low frequency to high frequency in a usable frequency band, while the PRACHs with odd serial numbers are mapped from low frequency to high frequency, or from high frequency to low frequency in the usable frequency band, and one PRACH occupies 6 RBs, the frequency bands occupied by two adjacent PRACHs in the frequency domain do not overlap, and the same mapping process is used for each version r; or the first half $$\left(w \leq \left\lceil \frac{W}{2} \right\rceil, \text{ or } w < \left\lceil \frac{W}{2} \right\rceil, \text{ or } w \leq \left\lfloor \frac{W}{2} \right\rfloor, \text{ or } w < \left\lfloor \frac{W}{2} \right\rfloor \right)$$

of the PRACHs are mapped from high frequency to low frequency, or from low frequency to high frequency in a usable frequency band, while the second half of the PRACHs are mapped from low frequency to high frequency, or from high frequency to low frequency in the usable frequency band, and one PRACH occupies 6 RBs, the frequency bands occupied by two adjacent PRACHs in the frequency domain do not overlap, and the same mapping process is used for each version number r; or
the PRACHs with even serial numbers are mapped from high frequency to low frequency, or from low frequency to high frequency in a usable frequency band, while the PRACH with odd serial numbers are mapped from low frequency to high frequency, or from high frequency to low frequency in the usable frequency band, and one PRACH occupies 6 RBs, the frequency bands occupied by two adjacent PRACHs in the frequency domain do not overlap; or the first half $$\left(w \leq \left\lceil \frac{W}{2} \right\rceil, \text{ or } w < \left\lceil \frac{W}{2} \right\rceil, \text{ or } w \leq \left\lfloor \frac{W}{2} \right\rfloor, \text{ or } w < \left\lfloor \frac{W}{2} \right\rfloor\right)$$

of the PRACHs are mapped from high frequency to low frequency, or from low frequency to high frequency in a usable frequency band, while the second half of the PRACHs are mapped from low frequency to high frequency, or from high frequency to low frequency in the usable frequency band, and one PRACH occupies 6 RBs, the frequency bands occupied by two adjacent PRACHs in the frequency domain do not overlap.

The above method for mapping PRACHs takes the factor of version number into account during a mapping process, thus it solves problems such as the PRACHs which need to be processed by the same base station are distributed unevenly in the time domain, and enable the PRACHs which need to be processed by the same domain to be distributed evenly in the time domain, and reduce the inter-cell interference of the second type PRACH to the greatest extent. In order to better describe the present invention, the following definitions are provided, which shall not be construed as limitations on the present invention.

If the density of a PRACH is D, and the number of versions is R, there are R⌈D⌉ PRACHs which need to be numbered in a random access period, i.e., $N_{ind}^{RA}=0, 1, \ldots, R\lceil D\rceil-1$. Wherein D indicates that how many PRACHs are usable in a random access period for a cell using the density, for example, D=n PRACH/10 ms indicates that n PRACHs are usable in each 10 ms random access period (n=0.5 indicates that 1 PRACH is usable in each 20 ms random access period). If it is assumed that the index of the usable PRACHs in a random access period for a certain cell is d (it can be referred to as intra-cell PRACH index or density index), and d=0, 1, . . . , ⌈D⌉−1, the version number is r, and r=0, 1, . . . , R−1, then the whole mapping algorithm is divided into two parts, i.e., PRACH numbering and frequency domain location mapping.

PRACH Numbering:
Method 1
Upon numbering, the density index is first incremented, and then the version number is incremented;
if the above definition is based on, $N_{ind}^{RA}=r\lceil D\rceil+d$, wherein $N_{ind}^{RA}=0, 1, \ldots, R\lceil D\rceil-1, d=0, 1, \ldots \lceil D\rceil-1, r=0, 1, \ldots, R-1$.
Method 2
Upon numbering, the version number is first incremented, and then the density index is incremented;
if the above definition is based on, $N_{ind}^{RA}=dR+r$, wherein $N_{ind}^{RA}=0, 1, \ldots, R\lceil D\rceil-1, d=0, 1, \ldots, \lceil D\rceil-1, r=0, 1, \ldots, R-1$.

In addition, upon numbering, it is required to be satisfied that $$\left\lceil \frac{N_{ind}^{RA}}{N_t^{RA}} \right\rceil \leq N_{RA}^{BW},$$

wherein $N_t^{RA}$ is the number of the PRACHs of the current format that can be contained in a random access period in the time domain, $N_{RA}^{BW}$ is the number of the PRACHs that can be contained in the usable frequency resource.

Frequency domain mapping: If one PRACH occupies L uplink subframes in the time domain, the PRACHs that mapped into these L uplink subframes are mapped in the frequency domain (for preamble format 4, the uplink subframe herein is the UpPTS).

Method 1
Mapping the PRACHs from low frequency to high frequency, or from high frequency to low frequency in the usable frequency resource, and one PRACH occupies 6 RBs, and the frequency bands occupied by two adjacent PRACHs in the frequency domain do not overlap.

Method 2
Mapping the PRACHs from the middle to the two sides of the usable frequency resource, and one PRACH occupies 6 RBs, and the frequency bands occupied by two adjacent PRACHs in the frequency domain do not overlap.

Figure 2:
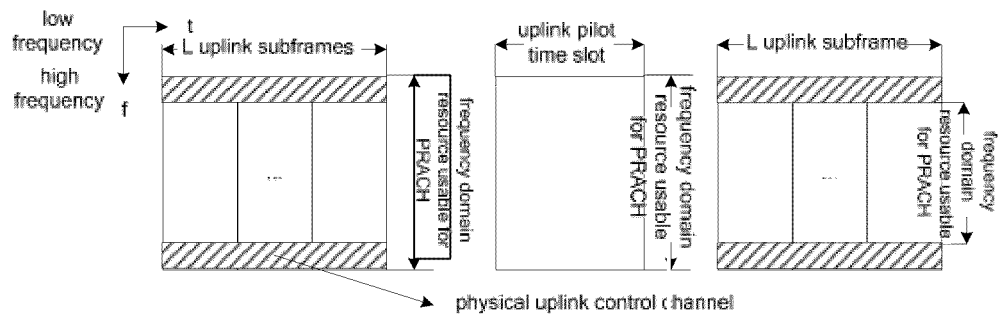
FIG. 2 shows a schematic diagram of usable frequency resource.

For normal uplink subframes, the usable frequency resource of PRACHs refers to all the usable frequency domain resource in the current system except for those occupied by the PUCCH, or all the usable frequency domain resource in the current system; for the UpPTS, the usable frequency resource of PRACHs refers to all the usable frequency resource in the current system, FIG. 2 shows a schematic diagram of the usable frequency resource.

Method 3
In the usable frequency resource, the PRACHs with the same version number r are mapped from low frequency to high frequency or from high frequency to low frequency, one PRACH occupies 6 RBs, and the frequency bands occupied by two adjacent PRACHs in the frequency domain do not overlap. The same mapping process is used for each version number r.

For example, the PRACHs with serial numbers of 0, 4, 6, 8, wherein 0 and 6 correspond to the same version number r, 4 and 8 correspond to the same version number r, 0 and 6 are mapped from low frequency to high frequency, 4 and 8 are also mapped from low frequency to high frequency, and finally 0 and 4 have the same frequency domain location, and 6 and 8 have the same frequency domain location.

Method 4
In the usable frequency resource, the PRACHs with the same version number r are mapped from low frequency to high frequency or from high frequency to low frequency, one PRACH occupies 6 RBs, and the frequency bands occupied by two adjacent PRACHs in the frequency domain do not overlap. The same mapping process is used for each version number r.

Method 5
The PRACHs with the same version number r are mapped from the two sides to the middle of the usable frequency resource.

Assume there are W PRACHs with a version number r mapped into these L subframes, and the W PRACHs are re-numbered as w=0, 1, 2, . . . , W−1, according to $N_{ind}^{RA}$ in the increasing order, the mapping method is:

the PRACHs with even serial numbers are mapped from high (or low) frequency to low (or high) frequency in a usable frequency band, while the PRACHs with odd serial numbers are mapped from low (or high) frequency to high (or low) frequency in the usable frequency band, and one PRACH occupies 6 continuous RBs in the frequency domain, the frequency bands occupied by two adjacent PRACHs in the frequency domain do not overlap. The same mapping process is used for each version number r; or the first half $$\left(w \leq \left\lceil \frac{W}{2} \right\rceil, \text{ or } w < \left\lceil \frac{W}{2} \right\rceil, \text{ or } w \leq \left\lfloor \frac{W}{2} \right\rfloor, \text{ or } w < \left\lfloor \frac{W}{2} \right\rfloor \right)$$

of the PRACHs are mapped from high (or low) frequency to low (or high) frequency in the usable frequency band, while the second half of the PRACHs are mapped from low (or high) frequency to high (or low) frequency in the usable frequency band, and one PRACH occupies 6 RBs in the frequency domain, and the frequency bands occupied by two adjacent PRACHs in the frequency domain do not overlap. The same mapping process is used for each version number r.

Figure 7:
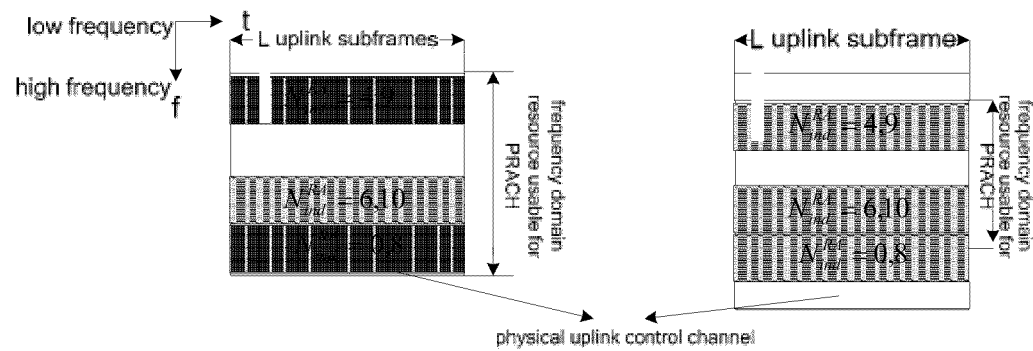
FIG. 7 shows a schematic diagram of the mapping process from both sides of the usable frequency band.

For example, for the PRACHs of preamble format 0, L=1, and the PRACHs with index $N_{ind}^{RA}$=0, 4, 6, 8, 9, 10 are mapped into a certain uplink subframe, wherein 0, 4, 6 correspond to the same version number r=0, 8, 9, 10, correspond to the same version number r=1; for r=0, w=0, 1, 2 correspond to 0, 4, 6; for r=1, w=0, 1, 2 correspond to 8, 9, 10. If the PRACHs with odd serial numbers are mapped from low frequency to high frequency in a usable frequency band, while the PRACHs with even serial numbers are mapped from high frequency to low frequency in the usable frequency band, the mapping result is shown in FIG. 7, wherein the PRACHs with $N_{ind}^{RA}$=0, 8 have the same frequency domain location; the PRACHs with $N_{ind}^{RA}$=4, 9 have the same frequency domain location; the PRACHs with $N_{ind}^{RA}$=6, 10 have the same frequency domain location.

Method 6

There are W PRACHs mapped into these L subframes, which are re-numbered as w=0, 1, 2, . . . , W−1 according to $N_{ind}^{RA}$ in the increasing order, the mapping method may be:

the PRACHs with even serial numbers are mapped from high (or low) frequency to low (or high) frequency in a usable frequency band, while the PRACHs with odd serial numbers are mapped from low (or high) frequency to high (or low) frequency in the usable frequency band, and one PRACH occupies 6 RBs, the frequency bands occupied by two adjacent PRACHs in the frequency domain do not overlap; or the first half $$\left(w \leq \left\lceil \frac{W}{2} \right\rceil, \text{ or } w < \left\lceil \frac{W}{2} \right\rceil, \text{ or } w \leq \left\lfloor \frac{W}{2} \right\rfloor, \text{ or } w < \left\lfloor \frac{W}{2} \right\rfloor \right)$$

of the PRACHs are mapped from high (or low) frequency to low (or high) frequency in a usable frequency band, while the second half of the PRACHs are mapped from low (or high) frequency to high (or low) frequency in the usable frequency band, and one PRACH occupies 6 RBs, the frequency bands occupied by two adjacent PRACHs in the frequency domain do not overlap.

The density D is directly informed to the mobile phone by a base station through control signals of the PRACH.

the number of versions R can be obtained through the following 3 methods:

(I) through the PRACH configuration type sent to the mobile phone by a base station, the number of versions R can be determined based on the number of the versions of the combination of the preamble format in the PRACH configuration set and the density;

(II) the number of versions is obtained through the formula $$R = \left\lfloor \frac{N_{RA}^{BW} \cdot N_{SP}}{D} \right\rfloor$$

based on $N_{RA}^{BW}$, the number of PRACHs supported by the system in the frequency domain; $N_{SP}$, the number of conversion points in 10 ms; and D, the density of PRACHs;

(III) the number of versions $$R = \min\left(\left\lfloor \frac{N_{RA}^{BW} \cdot N_{SP}}{D} \right\rfloor, 3\right),$$

i.e., the maximum of the number of versions is limited to 3.

The version number r can be obtained through the following two methods:

(I) directly obtained through the PRACH configuration type sent to the mobile phone by a base station;

(II) the version number is calculated according to the cell ID, i.e., r=$N_{ID}^{cell}$ mod R.

The PRACH frequency domain location mapping performed according to the methods provided in the embodiments of the present invention can enable the PRACHs that need to be processed by the same base station to be distributed evenly in the time domain, and can reduce the inter-cell interference of the second type PRACH to the greatest extent.

Embodiment 1

It is assumed that the density of the PRACHs is D (D=0.5, 1, 2, 3, 5, 10 PRACH/10 ms); the number of versions is R; the serial number $N_{ind}^{RA}$=0, 1, . . . , R⌈D⌉−1; the index of the usable PRACHs in a random access period for a certain cell is d (which can be referred to as intra-cell PRACH index or density index, d=0, 1, . . . , ⌈D⌉−1); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}$(i)

PRACH numbering: upon numbering, the density index is first incremented, then the version number is incremented, i.e., $N_{ind}^{RA}$=r⌈D⌉+d, wherein $N_{ind}^{RA}$=0, 1, . . . , R⌈D⌉−1, d=0, 1, . . . , ⌈D⌉−1, r∈[0,R−1].

Frequency Domain Mapping:

The PRACHs are mapped from low frequency to high frequency in the usable frequency resource according to the serial number ($N_{ind}^{RA}$) in the increasing order, one PRACH occupies 6 RBs, and the frequency bands occupied by two adjacent PRACHs in the frequency domain do not overlap.

The mapping principle mentioned above can be expressed by the following formulae:

$$N_{ind}^{RA} = r\lceil D \rceil + d$$

$$N_{ind}'^{RA} = \left\lfloor \frac{N_{ind}^{RA}}{\alpha + 1} \right\rfloor$$

-continued $$M_{ind}^{RA} = N_{ind}^{\prime RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right)L$$

$$f^{RA} = \left\lfloor \frac{N_{ind}^{\prime RA}}{\sum_{i=0}^{N_{SP}-1} N_{RA}^{HF}(i)} \right\rfloor$$

$$\alpha = (2D) \bmod 2$$

$$r = \begin{cases} N_{ID}^{cell} \bmod R, & R = \left\lfloor \frac{N_{SRA}^{BW} \cdot N_{SP}}{D} \right\rfloor & \text{for format4} \\ \text{based on signal,} & & \text{for } \textit{other formats} \end{cases}$$

where $d = 0, 1, \ldots, \lceil D \rceil - 1$, $D$ based on signal $$N_{RA}^{HF}(i) = \left\lfloor \frac{N_{sub\text{-}frame}^{UL,HF}(i)}{L} \right\rfloor$$

$L$ is number of $UL\,sub\text{-}frames\,for\,PRACH$ $$i = \begin{cases} 0, & 1st \text{ half frame} \\ 1, & 2nd \text{ half frame} \end{cases}$$

wherein (1) $t_0^{RA}$ is used to indicate in which radio frame the PRACH resides, 0 represents that the PRACH resides in each radio frame, 1 represents the radio frames with even serial numbers, and 2 represents the radio frames with odd serial numbers; in addition, when D=0.5, $N_{ind}^{RA}$=r, thus $t_0^{RA}$=α[(r mod 2)+1];

(2) $t_1^{RA}$ is used to indicate in which half frame the PRACH resides, 0 represents the first half frame, 1 represents the second half frame;

(3) $t_2^{RA}$ is used to indicate in which subframe of a certain half frame the PRACH resides, i.e., used to indicate the starting location of the PRACH in the certain half frame, namely, starting from which uplink subframe (short RACH does not need this parameter), for example, $t_2^{RA}$=0 represents starting from the first uplink subframe;

Without specific explanation, reference can be made to the explanation herein for the $t_0^{RA}$, $t_1^{RA}$, $t_2^{RA}$ in the following text;

(4) $f^{RA}$ denotes the serial number of a PRACH in the frequency domain, the mapping relationship between the serial number and the particular starting RB of the PRACHs in the frequency domain can be $k_{RA} = k'_{RA} + f^{RA} \cdot 6$, $k'_{RA}$ denotes the location of the first RB usable for the PRACH in the frequency domain;

(5) for preamble formats 0~3, L denotes the number of the uplink subframes occupied by the PRACHs of this format, $N_{sub\text{-}frame}^{UL,HF}(i)$ denotes the number of the uplink subframes in a half frame; for preamble format 4, L=1, $N_{sub\text{-}frame}^{UL,HF}(i)$ denotes the number of the UpPTS in a half frame, i=0 indicates the first half frame, and i=1 indicates the second half frame;

(6) for preamble formats 0~3, through the PRACH configuration type sent to the mobile phone by a base station, R can be determined based on the number of the versions of the combination of the preamble format in the PRACH configuration set and the density; for preamble format 4, $$R = \left\lfloor \frac{N_{RA}^{BW} \cdot N_{SP}}{D} \right\rfloor,$$

$N_{SRA}^{BW}$ the number of the PRACHs that can be contained in the frequency domain in the current system bandwidth;

(7) for preamble formats 0~3, r can be directly obtained through the PRACH configuration type sent to the mobile phone by a base station; for preamble format 4, r=$N_{ID}^{cell}$ mod R.

Figure 3:
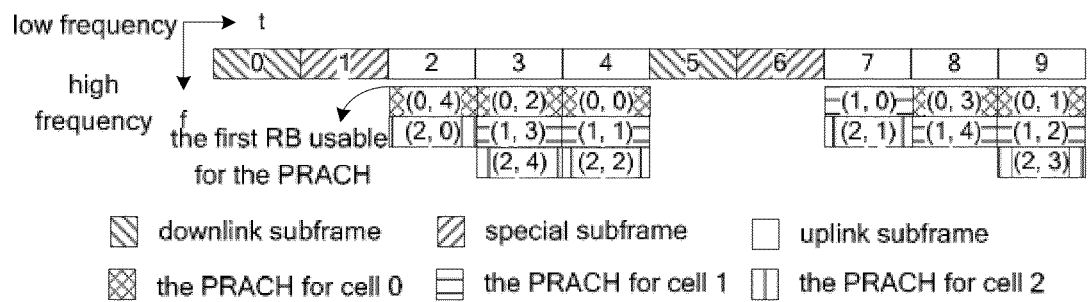
FIG. 3 shows Example 1 of the mapping result of Embodiment 1.
Figure 4:
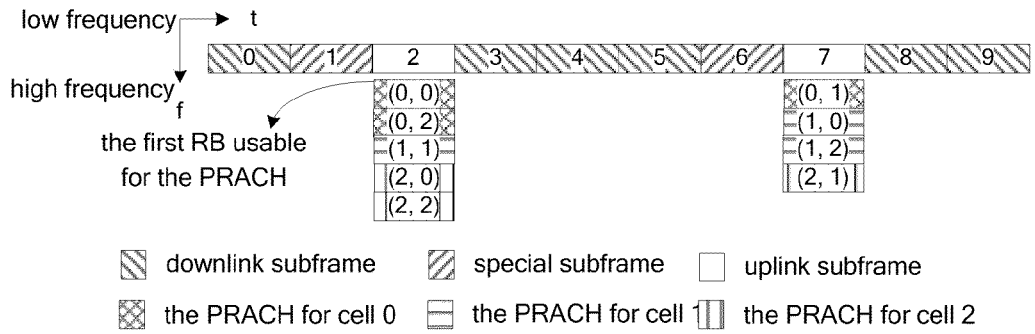
FIG. 4 shows Example 2 of the mapping result of Embodiment 1.

Based on the above mapping algorithm, if (r, d) represents the $d^{th}$ PRACH of the version number r, then:

(1) if R=3, D=5, the PRACH format is preamble format 0, D:U=1:3, then $N_{ind}^{RA}$=0, 1, ..., 14 respectively correspond to (0, 0), (0, 1), (0, 2), (0, 3), (0, 4), (1, 0), (1, 1), (1, 2), (1, 3), (1, 4), (2, 0), (2, 1), (2, 2), (2, 3), (2, 4), the mapping results of time and frequency domain locations are shown in FIG. 3;

(2) if R=3, D=3, the PRACH format is preamble format 0, D:U=3:1, then $N_{ind}^{RA}$=0, 1, ..., 8 respectively correspond to (0, 0), (0, 1), (0, 2), (1, 0), (1, 1), (1, 2), (2, 0), (2, 1), (2, 2), the mapping results of time and frequency domain locations are shown in FIG. 4;

Embodiment 2

It is assumed that the density of the PRACH is D (D=0.5, 1, 2, 3, 5, 10 PRACH/10 ms); the number of versions is R; the serial number $N_{ind}^{RA}$=0, 1, ..., R⌈D⌉−1; the index of the usable PRACHs in a random access period for a certain cell is d (which can be referred to as intra-cell PRACH index or density index, d=0, 1, ..., ⌈D⌉−1); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: Upon numbering, the density index is first incremented, then the version number is incremented, i.e., $N_{ind}^{RA}$=r⌈D⌉+d, wherein $N_{ind}^{RA}$=0, 1, ..., R⌈D⌉−1, d=0, 1, ..., ⌈D⌉−1, r∈[0,R−1].

Frequency Domain Mapping

The PRACHs are mapped from low frequency to high frequency in the usable frequency resource according to the serial number ($N_{ind}^{RA}$) in the increasing order, one PRACH occupies 6 RBs, and the frequency bands occupied by two adjacent PRACHs in the frequency domain do not overlap.

The mapping principle mentioned above can be expressed by the following formulae:

$$N_{ind}^{RA} = r\lceil D \rceil + d$$

$$N_{ind}^{\prime RA} = \left\lfloor \frac{N_{ind}^{RA}}{\alpha + 1} \right\rfloor$$

$$M_{ind}^{RA} = N_{ind}^{\prime RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right)L$$

-continued $$f^{RA} = \left\lfloor \frac{N'^{RA}_{ind}}{\sum_{i=0}^{N_{SP}-1} N^{HF}_{RA}(i)} \right\rfloor$$

$$\alpha = (2D) \bmod 2$$

$$d = 0, 1, \ldots, \lceil D \rceil - 1, D \text{ basedon signal}$$

where $$N^{HF}_{RA}(i) = \left\lfloor \frac{N^{UL,HF}_{sub-frame}(i)}{L} \right\rfloor$$

$L$ is number of $UL sub-framesforPRACH$ $$i = \begin{cases} 0, & 1st \text{ half frame} \\ 1, & 2nd \text{ half frame} \end{cases}$$

wherein (1) $f^{RA}$ denotes the serial number of the PRACH in the frequency domain, the mapping relationship between the serial number and the particular starting RB of the PRACHs in the frequency domain can be $k_{RA}=k'_{RA}+f^{RA}\times 6$, $k'_{RA}$ denotes the serial number of the first RB usable for the PRACH, i.e., $k'_{RA}$ denotes the location of the first RB usable for the PRACH in the frequency domain;

(2) for preamble formats 0~3, L denotes the number of the uplink subframes occupied by the PRACHs of this format, $N_{sub-frame}^{UL,HF}(i)$ denotes the number of the uplink subframes in a half frame; for preamble format 4, L=1, $N_{sub-frame}^{UL,HF}(i)$ denotes the number of the UpPTS in a half frame, i=0 indicates the first half frame, and i=1 indicates the second half frame;

(3) through the PRACH configuration type sent to the mobile phone by a base station, R can be determined based on the number of the versions of the combination of the preamble format in the PRACH configuration set and the density;

(4) the version number r can be directly obtained through the PRACH configuration type sent to the mobile phone by a base station.

Embodiment 3

It is assumed that the density of the PRACH is D (D=0.5, 1, 2, 3, 5, 10 PRACH/10 ms); the number of versions is R; the serial number $N_{ind}^{RA}=0, 1, \ldots, R\lceil D \rceil - 1$; the index of the usable PRACH in a random access period for a certain cell is d (which can be referred to as intra-cell PRACH index or density index, d=0, 1, \ldots, $\lceil D \rceil -1$); the version number is r (r∈[0,R−1]); the number of downlink-to-uplink conversion points in a 10 ms radio frame is $N_{SP}$; the number of the PRACHs of a certain format contained in the time domain of a half frame is $N_{RA}^{HF}(i)$.

PRACH numbering: upon numbering, the version number is first incremented, then the density index is incremented, i.e., $N_{ind}^{RA}=dR+r$, wherein $N_{ind}^{RA}=0, 1, \ldots, R\lceil D \rceil -1$, d=0, 1, \ldots, $\lceil D \rceil -1$, r∈[0,R−1].

Frequency Domain Mapping

According to the serial number ($N_{ind}^{RA}$) in the increasing order, the PRACHs are mapped from low frequency to high frequency in the usable frequency resource, one PRACH occupies 6 RBs, and the frequency bands occupied by two adjacent PRACHs in the frequency domain do not overlap.

The mapping principle mentioned above can be expressed by the following formulae:

$$N_{ind}^{RA} = dR + r$$

$$N'^{RA}_{ind} = \left\lfloor \frac{N^{RA}_{ind}}{\alpha + 1} \right\rfloor$$

$$M^{RA}_{ind} = N'^{RA}_{ind} \bmod \sum_{i=0}^{N_{SP}-1} N^{HF}_{RA}(i)$$

$$t_0^{RA} = \alpha[(N^{RA}_{ind} \bmod 2) + 1]$$

$$t_1^{RA} = M^{RA}_{ind} \bmod N_{SP}$$

$$t_2^{RA} = N^{UL,HF}_{sub-frame}(t_1^{RA}) - \left(\left\lfloor \frac{M^{RA}_{ind}}{N_{SP}} \right\rfloor + 1\right)L$$

$$f^{RA} = \left\lfloor \frac{N'^{RA}_{ind}}{\sum_{i=0}^{N_{SP}-1} N^{HF}_{RA}(i)} \right\rfloor$$

$$\alpha = (2D) \bmod 2$$

$$r = \begin{cases} N_{ID}^{cell} \bmod R, & R = \left\lfloor \frac{N_{SRA}^{BW} \cdot N_{SP}}{D} \right\rfloor \\ & \text{for format4} \\ basedon \text{ signal, for } other formats \end{cases}$$

where $$d = 0, 1, \ldots, \lceil D \rceil -1, D \text{ basedon signal}$$

$$N^{HF}_{RA}(i) = \left\lfloor \frac{N^{UL,HF}_{sub-frame}(i)}{L} \right\rfloor$$

$L$ is number of $UL sub-framesforPRACH$ $$i = \begin{cases} 0, & 1st \text{ half frame} \\ 1, & 2nd \text{ half frame} \end{cases}$$

wherein (1) $f^{RA}$ denotes the serial number of the PRACHs in the frequency domain, the mapping relationship between the serial number and the particular starting RB of the PRACHs in the frequency domain is $k_{RA}=k'_{RA}+f^{RA}\cdot 6$, $k'_{RA}$ denotes the location of the first RB usable for the PRACH in the frequency domain;

(2) for preamble formats 0~3, L denotes the number of the uplink subframes occupied by the PRACHs of this format, $N_{sub-frame}^{UL,HF}(i)$ denotes the number of the uplink subframes in a half frame; for preamble format 4, L=1, $N_{sub-frame}^{UL,HF}(i)$ denotes the number of the UpPTS in a half frame, i=0 indicates the first half frame, and i=1 indicates the second half frame;

(3) for preamble formats 0~3, through the PRACH configuration type sent to the mobile phone by a base station, R can be determined based on the number of the versions of the combination of the preamble format in the PRACH configuration set and the density; for preamble format 4, $$R = \left\lfloor \frac{N_{SRA}^{BW} \cdot N_{SP}}{D} \right\rfloor,$$

$N_{SRA}^{BW}$ denotes the number of PRACHs that can be contained in the frequency domain in the current system bandwidth;

(4) for preamble formats 0~3, r can be directly obtained through the PRACH configuration type sent to the mobile phone by a base station; for preamble format 4, $r=N_{ID}^{cell} \mod R$.

Embodiment 4

It is assumed that the density of the PRACHs is D (D=0.5, 1, 2, 3, 5, 10 PRACH/10 ms); the number of versions is R; the serial number $N_{ind}^{RA}$=0, 1, . . . , R⌈D⌉−1; the index of the usable PRACHs in a random access period for a certain cell is d (which can be referred to as intra-cell PRACH index or density index, d=0, 1, . . . , ⌈D⌉−1); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the version number is first incremented, then the density index is incremented, i.e., $N_{ind}^{RA}$=dR+r, wherein $N_{ind}^{RA}$=0, 1, . . . , R⌈D⌉−1, d=0, 1, . . . , ⌈D⌉−1, r∈[0,R−1].

Frequency Domain Mapping

According to the serial number ($N_{ind}^{RA}$) in the increasing order, the PRACHs are mapped from low frequency to high frequency in the usable frequency resource, one PRACH occupies 6 RBs, and the frequency bands occupied by two adjacent PRACHs in the frequency domain do not overlap.

The mapping principle mentioned above can be expressed by the following formulae:

$$N_{ind}^{RA} = dR + r$$

$$N_{ind}'^{RA} = \left\lfloor \frac{N_{ind}^{RA}}{\alpha + 1} \right\rfloor$$

$$M_{ind}^{RA} = N_{ind}'^{RA} \mod \sum_{i=0}^{N_{SP}-1} N_{RA}^{HF}(i)$$

$$t_0^{RA} = \alpha[(N_{ind}^{RA} \mod 2) + 1]$$

$$t_1^{RA} = M_{ind}^{RA} \mod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right)L$$

$$f^{RA} = \left\lfloor \frac{N_{ind}'^{RA}}{\sum_{i=0}^{N_{SP}-1} N_{RA}^{HF}(i)} \right\rfloor$$

$$\alpha = (2D) \mod 2$$

$$d = 0, 1, \ldots, \lceil D \rceil - 1, \text{ D basedon signal}$$

where $$N_{RA}^{HF}(i) = \left\lfloor \frac{N_{sub\text{-}frame}^{UL,HF}(i)}{L} \right\rfloor$$

L is number of ULsub-framesforPRACH $$i = \begin{cases} 0, & 1st \text{ half frame} \\ 1, & 2nd \text{ half frame} \end{cases}$$

wherein (1) $f^{RA}$ denotes the serial number of a PRACH in the frequency domain, the mapping relationship between the serial number and the particular starting RB of the PRACHs in the frequency domain can be $k_{RA}=k'_{RA}+f^{RA}\cdot 6$, $k'_{RA}$ denotes the location the first RB usable for the PRACH in the frequency domain;

(2) for preamble formats 0~3, L denotes the number of the uplink subframes occupied by the PRACHs of this format, $N_{sub\text{-}frame}^{UL,HF}(i)$ denotes the number of the uplink subframes in a half frame; for preamble format 4, L=1, $N_{sub\text{-}frame}^{UL,HF}(i)$ denotes the number of the UpPTS in a half frame, i=0 indicates the first half frame, and i=1 indicates the second half frame;

(3) through the PRACH configuration type sent to the mobile phone by a base station, R can be determined based on the number of the versions of the combination of the preamble format in the PRACH configuration set and the density;

(4) version number r can be directly obtained through the PRACH configuration type sent to the mobile phone by a base station.

Embodiment 5

It is assumed that the density of the PRACHs is D (D=0.5, 1, 2, 3, 5, 10 PRACH/10 ms); the number of versions is R; the serial number $N_{ind}^{RA}$=0, 1, . . . , R⌈D⌉−1; the index of the usable PRACHs in a random access period for a certain cell is d (which can be referred to as intra-cell PRACH index or density index, d=0, 1, . . . , ⌈D⌉−1); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the density index is first incremented, then the version number is incremented, i.e., $N_{ind}^{RA}$=r⌈D⌉+d, wherein $N_{ind}^{RA}$=0, 1, . . . , R⌈D⌉−1, d=0, 1, . . . , ⌈D⌉−1, r∈[0,R−1].

Frequency Domain Mapping

According to the serial number ($N_{ind}^{RA}$) in the increasing order, the PRACHs are mapped from low frequency to high frequency in the usable frequency resource, one PRACH occupies 6 RBs, and the frequency bands occupied by two adjacent PRACHs in the frequency domain do not overlap.

Embodiment 6

It is assumed that the density of the PRACHs is D (D=0.5, 1, 2, 3, 5, 10 PRACH/10 ms); the number of versions is R; the serial number $N_{ind}^{RA}$=0, 1, . . . , R⌈D⌉−1; the index of the usable PRACHs in a random access period for a certain cell is d (which can be referred to as intra-cell PRACH index or density index, d=0, 1, . . . , ⌈D⌉−1); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the density index is first incremented, then the version number is incremented, i.e., $N_{ind}^{RA}$=r⌈D⌉+d, wherein $N_{ind}^{RA}$=0, 1, . . . , R⌈D⌉−1, d=0, 1, . . . , ⌈D⌉−1, r∈[0,R−1].

Frequency Domain Mapping

For Preamble Format 4

According to the serial number ($N_{ind}^{RA}$) in the increasing order, the PRACHs are mapped from low frequency to high frequency in the usable frequency resource, one PRACH occupies 6 RBs, and the frequency bands occupied by two adjacent PRACHs in the frequency domain do not overlap.

For Preamble Formats 0~3

According to the serial number ($N_{ind}^{RA}$) in the increasing order, the PRACHs with the same version number r are mapped from low frequency to high frequency in the usable frequency resource, one PRACH occupies 6 RBs, and the frequency bands occupied by two adjacent PRACHs in the frequency domain do not overlap. The same mapping process is used for each version number r.

The mapping principle mentioned above can be expressed by the following formulae:

$$N_{ind}^{RA} = r\lceil D\rceil + d$$

$$N'^{RA}_{ind} = \left\lfloor \frac{N_{ind}^{RA}}{\alpha+1} \right\rfloor$$

$$M_{ind}^{RA} = N'^{RA}_{ind} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right) L$$

$$f_{LRA}^r(t_{RA}^0, t_{RA}^1, t_{RA}^2) = 0, 1, \ldots, N_{RA}^r(t_{RA}^0, t_{RA}^1, t_{RA}^2) - 1$$

$$f_{SRA} = \left\lfloor \frac{N_{RA}^{\prime ind}}{\sum_{i=0}^{N_{SP}-1} N_{RA}^{HF}(i)} \right\rfloor$$

$$\alpha = (2D) \bmod 2$$

$$r = \begin{cases} N_{ID}^{cell} \bmod R, & R = \left\lfloor \frac{N_{SRA}^{BW} \cdot N_{SP}}{D} \right\rfloor \\ & \text{for format 4} \\ \text{based on signal,} & \text{for other formats} \end{cases}$$

where $d = 0, 1, \ldots, \lceil D \rceil - 1$, $D$ based on signal $$N_{RA}^{HF}(i) = \left\lfloor \frac{N_{sub\text{-}frame}^{UL,HF}(i)}{L} \right\rfloor$$

$L$ is number of ULsub-framesfor PRACH $$i = \begin{cases} 0, & 1st \text{ half frame} \\ 1, & 2nd \text{ half frame} \end{cases}$$

wherein (1) $f_{SRA}$ denotes the frequency domain mapping index of preamble format 4 (the serial number of a PRACH in the frequency domain), the particular location in the frequency domain can be $k_{RA}=k'_{RA}+f_{SRA}\cdot 6$, $k'_{RA}$ denotes the location of the first RB usable for the PRACH in the frequency domain;

(2) $f_{LRA}^r(t_{RA}^0, t_{RA}^1, t_{RA}^2)$ denotes the frequency domain mapping index of preamble formats 0~3 (the serial number of a PRACH in the frequency domain), which implies the frequency domain channel numbers of all PRACHs, of which the version numbers are r and the time domain locations are determined by $(t_{RA}^0, t_{RA}^1, t_{RA}^2)$. The mapping relationship between the serial number and the particular starting RB of the PRACHs in the frequency domain is $k_{RA}=k'_{RA}+f_{LRA}^r(t_{RA}^0, t_{RA}^1, t_{RA}^2)\cdot 6$, k denotes the location of the first RB usable for the PRACH in the frequency domain;

3) $N_{RA}^r(t_{RA}^0, t_{RA}^1, t_{RA}^2)$ denotes the number of all PRACHs, of which the version numbers are r and the time domain locations are determined by $(t_{RA}^0, t_{RA}^1, t_{RA}^2)$.

(4) for preamble formats 0~3, L denotes the number of the uplink subframes occupied by the PRACHs of this format, $N_{sub\text{-}frame}^{UL,HF}(i)$ denotes the number of uplink subframes in a half frame; for preamble format 4, L=1, $N_{sub\text{-}frame}^{UL,HF}(i)$ denotes the number of the UpPTS in a half frame, i=0 indicates the first half frame, i=1 indicates the second half frame;

(5) for preamble formats 0~3, through the PRACH configuration type sent to the mobile phone by a base station, R can be determined based on the number of the versions of the combination of the preamble format in the PRACH configuration set and the density; for preamble format 4, $$R = \left\lfloor \frac{N_{SRA}^{BW} \cdot N_{SP}}{D} \right\rfloor,$$

$N_{SRA}^{BW}$ denotes the number of the PRACHs that can be contained in the current system bandwidth in the frequency domain;

(6) for preamble formats 0~3, r can be directly obtained through the PRACH configuration type sent to the mobile phone by a base station; for preamble format 4, $r=N_{ID}^{cell} \bmod R$.

Figure 5:
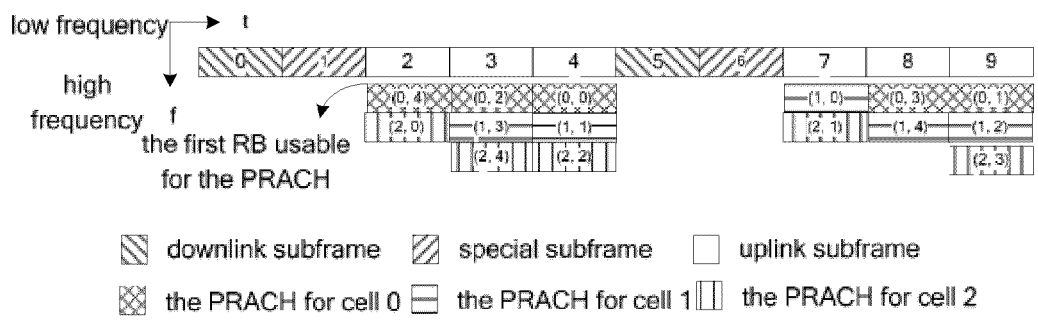
FIG. 5 shows Example 1 of the mapping result of Embodiment 6.

Based on the above mapping algorithm, if (r, d) represents the $d^{th}$ PRACH of the version r, then:

(1) if R=3, D=5, the PRACH format is preamble format 0, D:U=1:3, then $N_{ind}^{RA}=0, 1, \ldots, 14$ respectively correspond to (0, 0), (0, 1), (0, 2), (0, 3), (0, 4), (1, 0), (1, 1), (1, 2), (1, 3), (1, 4), (2, 0), (2, 1), (2, 2), (2, 3), (2, 4), the mapping results of time and frequency domain locations are shown in FIG. 5, wherein (0, 0), (1, 1), (2, 2) have the same frequency domain location; (0, 2), (1, 3), (2, 4) have the same frequency domain location; (0, 4), (2, 0) have the same frequency domain location; (0, 1), (1, 2), (2, 3) have the same frequency domain location; (0, 3), (1, 4) have the same frequency domain location; (1, 0), (2, 1) have the same frequency domain location.

Figure 6:
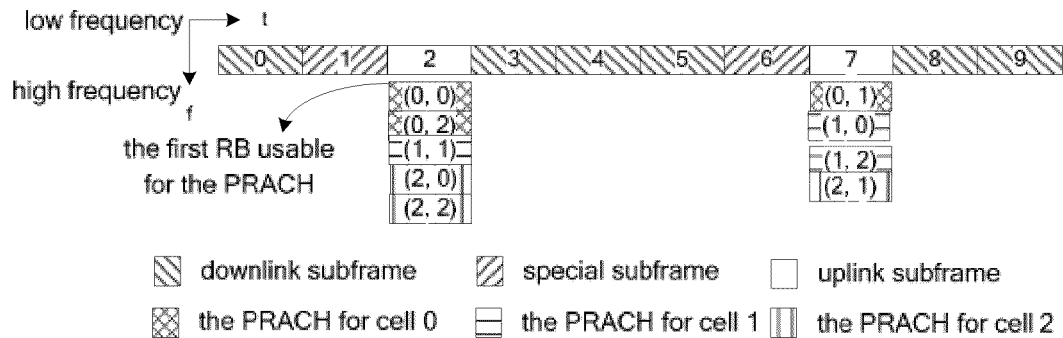
FIG. 6 shows Example 2 of the mapping result of Embodiment 6.

(2) if R=3, D=3, the PRACH format is preamble format 0, D:U=3:1, then $N_{ind}^{RA}=0,1, \ldots,8$ respectively corresponds to (0, 0), (0, 1), (0, 2), (1, 0), (1, 1), (1, 2), (2, 0), (2 1), (2, 2), the mapping results of time and frequency domain locations are shown in FIG. 6, wherein (0, 0), (1, 1), (2, 0) have the same frequency domain location; (0, 2), (2, 2) have the same frequency domain location; (0, 1), (1, 0), (2, 1) have the same frequency domain location.

Embodiment 7

It is assumed that the density of the PRACHs is D (D=0.5, 1, 2, 3, 5, 10 PRACH/10 ms); the number of versions is R; the serial number $N_{ind}^{RA}=0, 1, \ldots, R\lceil D\rceil -1$; the index of the usable PRACH in a random access period for a certain cell is d (which can be referred to as intra-cell PRACH index or density index, d=0, 1, . . . , $\lceil D\rceil -1$); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the density index is first incremented, then the version number is incremented, i.e., $N_{ind}^{RA}=r\lceil D\rceil+d$, wherein $N_{ind}^{RA}=0, 1, \ldots, R\lceil D\rceil-1, d=0, 1, \ldots, \lceil D\rceil -1$, r∈[0,R−1].

Frequency Domain Mapping

For Preamble Format 4

According to the serial number ($N_{ind}^{RA}$) in the increasing order, the PRACHs are mapped from low frequency to high frequency in the usable frequency resource, one PRACH occupies 6 RBs, the frequency bands occupied by two adjacent PRACHs in the frequency domain do not overlap.

For Preamble Formats 0~3

According to the serial number ($N_{ind}^{RA}$) in the increasing order, the PRACHs with the same version number r are mapped from low frequency to high frequency in the usable frequency resource, one PRACH occupies 6 RBs, and the frequency bands occupied by two adjacent PRACHs in the frequency domain do not overlap. The same mapping process is used for each version number r.

The mapping principle mentioned above can be expressed by the following formulae:

$$N_{ind}^{RA} = r\lceil D\rceil + d$$

$$N_{ind}^{\prime RA} = \left\lfloor \frac{N_{ind}^{RA}}{\alpha+1} \right\rfloor$$

$$M_{ind}^{RA} = N_{ind}^{\prime RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right)L$$

$$f_{LRA}^r(t_{RA}^0, t_{RA}^1, t_{RA}^2) = 0, 1, \ldots, N_{RA}^r(t_{RA}^0, t_{RA}^1, t_{RA}^2) - 1$$

$$f_{SRA} = \left\lfloor \frac{N_{RA}^{\prime ind}}{\sum_{i=0}^{N_{SP}-1} N_{RA}^{HF}(i)} \right\rfloor$$

$$\alpha = (2D) \bmod 2$$

$$d = 0, 1, \ldots, \lceil D\rceil - 1, D \text{ basedon signal}$$

where $$N_{RA}^{HF}(i) = \left\lfloor \frac{N_{sub\text{-}frame}^{UL,HF}(i)}{L} \right\rfloor$$

$L$ is number of $UL$ sub-frames for $PRACH$ $$i = \begin{cases} 0, & 1st \text{ half frame} \\ 1, & 2nd \text{ half frame} \end{cases}$$

wherein (1) $f_{SRA}$ denotes the frequency domain mapping index of preamble format 4 (the serial number of a PRACH in the frequency domain), the particular location in the frequency domain can be $k_{RA}=k'_{RA}+f_{SRA}\cdot 6$, $k'_{RA}$ denotes the location of the first RB usable for the PRACH in the frequency domain;

(2) $f_{LRA}^r(t_{RA}^0, t_{RA}^1, t_{RA}^2)$ denotes the frequency domain mapping index of preamble formats 0~3 (the serial number of a PRACH in the frequency domain), which implies: the frequency domain channel numbers of all PRACHs, of which the version numbers are r and the time domain locations are determined by $(t_{RA}^0, t_{RA}^1, t_{RA}^2)$. The mapping relationship between the serial number and the particular starting RB of the PRACHs in the frequency domain is $k_{RA}=k'_{RA}+f_{LRA}^r(t_{RA}^0, t_{RA}^1, t_{RA}^2)\cdot 6$, k denotes the location of the first RB usable for the PRACH in the frequency domain;

3) $N_{RA}^r(t_{RA}^0, t_{RA}^1, t_{RA}^2)$ denotes the number of all PRACHs, of which the version numbers are r and the time domain locations are determined by $(t_{RA}^0, t_{RA}^1, t_{RA}^2)$.

(4) for preamble formats 0~3, L denotes the number of the uplink subframes occupied by the PRACHs of this format, $N_{sub\text{-}frame}^{UL,HF}(i)$ denotes the number of the uplink subframes in a half frame; for preamble format 4, L=1, $N_{sub\text{-}frame}^{UL,HF}(i)$ denotes the number of the UpPTS in a half frame, i=0 indicates the first half frame, i=1 indicates the second half frame;

(5) through the PRACH configuration type sent to the mobile phone by a base station, R can be determined based on the number of the versions of the combination of the preamble format in the PRACH configuration set and the density;

(6) the version number r can be directly obtained through the PRACH configuration type sent to the mobile phone by a base station.

Embodiment 8

It is assumed that the density of the PRACHs is D (D=0.5, 1, 2, 3, 5, 10 PRACH/10 ms); the number of versions is R; the serial number $N_{ind}^{RA}$=0, 1, ..., R$\lceil D\rceil$−1; the index of the usable PRACHs in a random access period for a certain cell is d (which can be referred to as intra-cell PRACH index or density index, d=0, 1, ..., $\lceil D\rceil$−1); the version number r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the version number is first incremented, then the density index in incremented, i.e., $N_{ind}^{RA}=dR+r$, wherein $N_{ind}^{RA}$=0, 1, ..., R$\lceil D\rceil$−1, d=0, 1, ..., $\lceil D\rceil$−1, r∈[0,R−1].

Frequency Domain Mapping

For Preamble Format 4

According to the serial number $N_{ind}^{RA}$ in the increasing order, the PRACHs are mapped from low frequency to high frequency in the usable frequency resource, one PRACH occupies 6 RBs, and the frequency bands occupied by two adjacent PRACHs in the frequency domain do not overlap.

For Preamble Formats 0~3

According to the serial number ($N_{ind}^{RA}$) in the increasing order, the PRACHs with the same version number r are mapped from low frequency to high frequency in the usable frequency resource, one PRACH occupies 6 RBs, and the frequency bands occupied by two adjacent PRACHs in the frequency domain do not overlap. The same mapping process is used for each version number r.

The mapping principle mentioned above can be expressed by the following formulae:

$$N_{ind}^{RA} = dR + r$$

$$N_{ind}^{\prime RA} = \left\lfloor \frac{N_{ind}^{RA}}{\alpha+1} \right\rfloor$$

$$M_{ind}^{RA} = N_{ind}^{\prime RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right)L$$

$$f_{LRA}^r(t_{RA}^0, t_{RA}^1, t_{RA}^2) = 0, 1, \ldots, N_{RA}^r(t_{RA}^0, t_{RA}^1, t_{RA}^2) - 1$$

$$f_{SRA} = \left\lfloor \frac{N_{RA}^{\prime ind}}{\sum_{i=0}^{N_{SP}-1} N_{RA}^{HF}(i)} \right\rfloor$$

$$\alpha = (2D) \bmod 2$$

$$r = \begin{cases} N_{ID}^{cell} \bmod R, & R = \left\lfloor \dfrac{N_{SRA}^{BW} \cdot N_{SP}}{D} \right\rfloor \\ & \text{for format 4} \\ \text{basedon signal,} & \text{for } other formats \end{cases}$$

-continued where $d = 0, 1, \ldots, \lceil D \rceil - 1$, $D$ basedon signal $$N_{RA}^{HF}(i) = \left\lfloor \frac{N_{sub-frame}^{UL,HF}(i)}{L} \right\rfloor$$

$L$ is number of $UL$ sub-frames for $PRACH$ $$i = \begin{cases} 0, & 1st \text{ half frame} \\ 1, & 2nd \text{ half frame} \end{cases}$$

wherein (1) $f_{SRA}$ denotes the frequency domain mapping index of preamble format 4 (the serial number of a PRACH in the frequency domain), the particular location in the frequency can be $k_{RA}=k'_{RA}+f_{SRA}\cdot 6$, $k'_{RA}$ denotes the location of the first RB usable for the PRACH in the frequency domain;

(2) $f_{LRA}^{r}(t_{RA}^{0}, t_{RA}^{1}, t_{RA}^{2})$ denotes the frequency domain mapping index of preamble formats 0~3 (the serial number of a PRACH in the frequency domain), which implies the frequency domain channel numbers of all PRACHs, of which the version numbers are r and the time domain locations are determined by $(t_{RA}^{0}, t_{RA}^{1}, t_{RA}^{2})$. The mapping relationship between the serial number and the particular starting RB of the PRACHs in the frequency domain is $k_{RA}=k'_{RA}+f_{LRA}^{r}(t_{RA}^{0}, t_{RA}^{1}, t_{RA}^{2})\cdot 6$, $k'_{RA}$ denotes the location of the first RB usable for the PRACH in the frequency domain;

3) $N_{RA}^{r}(t_{RA}^{0}, t_{RA}^{1}, t_{RA}^{2})$ denotes the number of all PRACHs, of which the version numbers are r and the time domain locations are determined by $(t_{RA}^{0}, t_{RA}^{1}, t_{RA}^{2})$ (4) for preamble formats 0~3, L denotes the number of the uplink subframes occupied by the PRACHs of this format, $N_{sub-frame}^{UL,HF}(i)$ denotes the number of the uplink subframes in a half frame; for preamble format 4, L=1, $N_{sub-frame}^{UL,HF}(i)$ denotes the number of the UpPTS in a half frame, i=0 indicates the first half frame, i=1 indicates the second half frame;

(5) for preamble formats 0~3, through the PRACH configuration type sent to the mobile phone by a base station, R can be determined based on the number of the versions of the combination of the preamble format in the PRACH configuration set and the density; for preamble format 4, $$R = \left\lfloor \frac{N_{RA}^{BW} \cdot N_{SP}}{D} \right\rfloor,$$

$N_{SRA}^{BW}$ denotes the number of PRACHs that can be contained in the current system bandwidth in the frequency domain;

(6) for preamble formats 0~3, r can be directly obtained through the PRACH configuration type sent to the mobile phone by a base station; for preamble format 4, $r=N_{ID}^{cell}$ mod R.

Embodiment 9

It is assumed that the density of the PRACH is D (D=0.5, 1, 2, 3, 5, 10 PRACH/10 ms); the number of versions is R; the serial number $N_{ind}^{RA}=0, 1, \ldots, R\lceil D \rceil - 1$; the index of the usable PRACH in a random access period for a certain cell is d (which can be referred to as intra-cell PRACH index or density index, d=0, 1, ..., $\lceil D \rceil - 1$); the version number is r (r∈[0,R-1]); the number of downlink-to-uplink conversion points in a 10 ms radio frame is $N_{SP}$; the number of PRACHs of a certain format contained in a half frame in the time domain is $N_{RA}^{HF}(i)$.

PRACH numbering: the version number is first incremented, then the density index is incremented, i.e., $N_{ind}^{RA}=dR+r$, wherein $N_{ind}^{RA}=0, 1, \ldots, R\lceil D \rceil - 1$, d=0, 1, ..., $\lceil D \rceil - 1$, r∈[0,R-1].

Frequency Domain Mapping

For Preamble Format 4

According to the serial number ($N_{ind}^{RA}$) in the increasing order, the PRACHs are mapped from low frequency to high frequency in the usable frequency resource, one PRACH occupies 6 RBs, the frequency bands occupied by two adjacent PRACHs in the frequency domain do not overlap.

For Preamble Formats 0~3

According to the serial number ($N_{ind}^{RA}$) in the increasing order, the PRACHs with the same version number r are mapped from low frequency to high frequency in the usable frequency resource, one PRACH occupies 6 RBs, the frequency bands occupied by two adjacent PRACHs in the frequency domain do not overlap. The same mapping process is used for each version number r.

The mapping principle mentioned above can be expressed by the following formulae:

$$N_{ind}^{RA} = dR + r$$

$$N_{ind}^{\prime RA} = \left\lfloor \frac{N_{ind}^{RA}}{\alpha + 1} \right\rfloor$$

$$M_{ind}^{RA} = N_{ind}^{\prime RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub-frame}^{UL,HF}(t_1^{RA}) - \left(\left\lfloor \frac{M_{ind}^{RA}}{N_{SP}} \right\rfloor + 1\right)L$$

$$f_{LRA}^{r}(t_{RA}^0, t_{RA}^1, t_{RA}^2) = 0, 1, \ldots, N_{RA}^{r}(t_{RA}^0, t_{RA}^1, t_{RA}^2) - 1$$

$$f_{SRA} = \left\lfloor \frac{N_{RA}^{\prime ind}}{\sum_{i=0}^{N_{SP}-1} N_{RA}^{HF}(i)} \right\rfloor$$

$$\alpha = (2D) \bmod 2$$

$d = 0, 1, \ldots, \lceil D \rceil - 1$, $D$ basedon signal where $$N_{RA}^{HF}(i) = \left\lfloor \frac{N_{sub-frame}^{UL,HF}(i)}{L} \right\rfloor$$

$L$ is number of $UL$ sub-frames for $PRACH$ $$i = \begin{cases} 0, & 1st \text{ half frame} \\ 1, & 2nd \text{ half frame} \end{cases}$$

wherein (1) $f_{SRA}$ denotes the frequency domain mapping index of preamble format 4 (the serial number of the PRACH in the frequency domain), the particular location in the frequency domain can be $k_{RA}=k'_{RA}+f_{SRA}\cdot 6$, $k'_{RA}$ denotes the location of the first RB usable for the PRACH in the frequency domain;

(2) $f_{LRA}^{r}(t_{RA}^{0}, t_{RA}^{1}, t_{RA}^{2})$ denotes the frequency domain mapping index of preamble formats 0~3 (the serial number of the PRACH in the frequency domain), which implies the frequency domain channel numbers of all PRACHs, of which the version numbers are r and the time domain locations are determined by $(t_{RA}^0, t_{RA}^1, t_{RA}^2)$. The mapping relationship between the serial number and the particular starting RB of the PRACHs in the frequency domain is $k_{RA} = k'_{RA} + f_{LRA}^r (t_{RA}^0, t_{RA}^1, t_{RA}^2) \cdot 6$, $k'_{RA}$ denotes the location of the first RB usable for the PRACH in the frequency domain;

3) $N_{RA}^r(t_{RA}^0, t_{RA}^1, t_{RA}^2)$ denotes the number of all PRACHs, of which the version numbers are r and the time domain locations are determined by $(t_{RA}^0, t_{RA}^1, t_{RA}^2)$ (4) for preamble formats 0~3, L denotes the number of the uplink subframes occupied by the PRACHs of this format, $N_{sub-frame}^{UL,HF}(i)$ denotes the number of the uplink subframes in a half frame; for preamble format 4, L=1, $N_{sub-frame}^{UL,HF}(i)$ denotes the number of the UpPTS in a half frame, i=0 indicates the first half frame, i=1 indicates the second half frame;

(5) through the PRACH configuration type sent to the mobile phone by a base station, R can be determined based on the number of the versions of the combination of the preamble format in the PRACH configuration set and the density;

(6) version number r can be directly obtained through the PRACH configuration type sent to the mobile phone by a base station.

Embodiment 10

It is assumed that the density of the PRACH is D (D=0.5, 1, 2, 3, 5, 10 PRACH/10 ms); the number of versions is R; the serial number $N_{ind}^{RA}=0, 1, \ldots, R\lceil D \rceil -1$; the index of the usable PRACH in a random access period for a certain cell is d (which can be referred to as intra-cell PRACH index or density index, d=0, 1, \ldots, $\lceil D \rceil - 1$); the version number is r ($r \in [0,R-1]$); the number of downlink-to-uplink conversion points in a 10 ms radio frame is $N_{SP}$; the number of PRACHs of a certain format contained in a half frame in the time domain is $N_{RA}^{HF}(i)$.

PRACH numbering: upon numbering, the density index is first incremented, then the version number is incremented, i.e., $N_{ind}^{RA} = r\lceil D \rceil + d$, wherein $N_{ind}^{RA}=0, 1, \ldots, R\lceil D \rceil -1$, d=0, 1, \ldots, $\lceil D \rceil -1$, $r \in [0,R-1]$.

Frequency Domain Mapping

For Preamble Format 4

According to the serial number ($N_{ind}^{RA}$) in the increasing order, PRACHs can be mapped from low frequency to high frequency in the usable frequency resource, one PRACH occupies 6 RBs, the frequency bands occupied by two adjacent PRACHs in the frequency domain do not overlap.

Embodiment 11

It is assumed that the density of the PRACH is D (D can be 0.5, 1, 2, 3, 4, 5, 6, or 10 PRACH/10 ms); the number of versions is R; the serial number is $N_{ind}^{RA}=0, 1, \ldots, R\lceil D \rceil -1$; the index of the usable PRACH in a random access period for a certain cell is d (which can be referred to as intra-cell PRACH index or density index, d=0, 1, \ldots, $\lceil D \rceil -1$); the version number is r ($r \in [0,R-1]$); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the density index is first incremented, then the version number is incremented, i.e., $N_{ind}^{RA} = r\lceil D \rceil + d$, wherein $N_{ind}^{RA}=0, 1, \ldots, R\lceil D \rceil -1$, d=0, 1, \ldots, $\lceil D \rceil -1$, $r \in [0,R-1]$.

Frequency Domain Mapping

For Preamble Format 4

According to the serial number ($N_{ind}^{RA}$) in the increasing order, the PRACHs are mapped from low frequency to high frequency in the usable frequency resource, one PRACH occupies 6 RBs, the frequency bands occupied by two adjacent PRACHs in the frequency domain do not overlap.

For Preamble Formats 0~3

According to the serial number ($N_{ind}^{RA}$) in the increasing order, the PRACHs with the same version number r are mapped from the two sides to the middle of the usable frequency resource.

It is assumed that there are W PRACHs with the version number r mapped to these L subframes, which are re-numbered as w=0, 1, 2, \ldots, W-1 according to the serial number ($N_{ind}^{RA}$) in the increasing order, the mapping method is that the PRACHs with even numbers are mapped from low frequency to high frequency in the usable frequency bands, while the PRACHs with odd numbers are mapped from high frequency to low frequency, and one PRACH occupies 6 RBs, and the frequency bands occupied by two adjacent PRACHs in the frequency domain do not overlap. The same mapping process is used for each version number r.

The mapping principle mentioned above can be expressed by the following formulae:

$$N_{ind}^{RA} = r\lceil D \rceil + d$$

$$N_{ind}'^{RA} = \left\lfloor \frac{N_{ind}^{RA}}{\alpha + 1} \right\rfloor$$

$$M_{ind}^{RA} = N_{ind}'^{RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub-frame}^{UL,HF}(t_1^{RA}) - \left( \left\lfloor \frac{M_{ind}^{RA}}{N_{SP}} \right\rfloor + 1 \right) L$$

$$f_{LRA}^r(t_{RA}^0, t_{RA}^1, t_{RA}^2) = 0, 1, \ldots, N_{LRA}^r(t_{RA}^0, t_{RA}^1, t_{RA}^2) - 1$$

$$f_{SRA} = \left\lfloor \frac{N_{RA}'^{ind}}{\sum_{i=0}^{N_{SP}-1} N_{RA}^{HF}(i)} \right\rfloor$$

$$\alpha = (2D) \bmod 2$$

$$r = \begin{cases} N_{ID}^{cell} \bmod R, & R = \left\lfloor \frac{N_{SRA}^{BW} \cdot N_{SP}}{D} \right\rfloor \\ & \text{for format 4} \\ \text{basedon signal,} & \text{for other formats} \end{cases}$$

where $d = 0, 1, \ldots, \lceil D \rceil - 1$, $D$ basedon signal $$N_{RA}^{HF}(i) = \left\lfloor \frac{N_{sub-frame}^{UL,HF}(i)}{L} \right\rfloor$$

$L$ is number of $UL sub\text{-}frames for PRACH$ $$i = \begin{cases} 0, & 1st \text{ half frame} \\ 1, & 2nd \text{ half frame} \end{cases}$$

wherein (1) $f_{SRA}$ denotes the frequency domain mapping index of preamble format 4 (the serial number of the PRACH in the frequency domain), which is equivalent to $f_{SRA}(t_{RA}^0, t_{RA}^1, t_{RA}^2)=0, 1, \ldots, N_{SRA}(t_{RA}^0, t_{RA}^1, t_{RA}^2)-1$, i.e., the result of re-numbering all the PRACHs, of which the time domain locations are determined by $(t_{RA}^0, t_{RA}^1, t_{RA}^2)$, according to their $N_{ind}^{RA}$ in the increasing order. The mapping relationship between the serial number and the particular starting RB of the PRACHs in the frequency domain can be $k_{RA}=k'_{RA}+f_{SRA}\cdot 6$, $k'_{RA}$ denotes the location of the first RB usable for the PRACH in the frequency domain;

(2) $f_{LRA}^r(t_{RA}^0, t_{RA}^1, t_{RA}^2)$ denotes the frequency domain mapping index of preamble formats 0~3 (the serial number of the PRACH in the frequency domain), which implies the result of re-numbering all PRACHs with the version number r, of which the time domain locations are determined by $(t_{RA}^0, t_{RA}^1, t_{RA}^2)$, according to their $N_{ind}^{RA}$ in the increasing order. The mapping relationship between the serial number and the particular starting RB of the PRACHs in the frequency domain can be $$k_{RA} \begin{cases} k'_{RA} + 6\left\lfloor \frac{f_{LRA}^r(t_{RA}^0, t_{RA}^1, t_{RA}^2)}{2} \right\rfloor, & f_{LRA}^r(t_{RA}^0, t_{RA}^1, t_{RA}^2) \bmod 2 = 0 \\ N_{RB}^{UL} - 6 - k'_{RA} - 6\left\lfloor \frac{f_{LRA}^r(t_{RA}^0, t_{RA}^1, t_{RA}^2)}{2} \right\rfloor, & \text{otherwise,} \end{cases}$$

$k'_{RA}$ denotes the location of the first RB usable for the PRACH in the frequency domain, $N_{RB}^{UL}$, denotes the total number of blocks.

(3) $N_{RA}^r(t_{RA}^0, t_{RA}^1, t_{RA}^2)$ denotes the numbers of all PRACHs (preamble formats 0—3), of which the version numbers are r and the time domain locations are determined by $(t_{RA}^0, t_{RA}^1, t_{RA}^2)$; $N_{SRA}(t_{RA}^0, t_{RA}^1, t_{RA}^2)$ denotes the numbers of all PRACHs (preamble format 4), of which the time domain locations are determined by $(t_{RA}^0, t_{RA}^1, t_{RA}^2)$;

(4) for preamble formats 0~3, L denotes the number of the uplink subframes occupied by the PRACHs of this format, $N_{sub-frame}^{UL,HF}(i)$ denotes the number of the uplink subframes in a half frame; for preamble format 4, L=1, $N_{sub-frame}^{UL,HF}(i)$ denotes the number of the UpPTS in a half frame, i=0 indicates the first half frame, i=1 indicates the second half frame;

(5) for preamble formats 0~3, through the PRACH configuration type sent to the mobile phone by a base station, R can be determined based on the number of the versions of the combination of the preamble format in the PRACH configuration set and the density; for preamble format 4, $$R = \left\lfloor \frac{N_{SRA}^{BW} \cdot N_{SP}}{D} \right\rfloor,$$

$N_{SRA}^{BW}$ denotes the number of the PRACHs contained in the current system bandwidth in the frequency domain; or $$R = \min\left(\left\lfloor \frac{N_{RA}^{BW} \cdot N_{SP}}{D} \right\rfloor, 3\right);$$

or it can be determined through the PRACH configuration type sent to the mobile phone by a base station, based on the number of the versions of the combination of the preamble format in the PRACH configuration set and the density;

(6) for preamble formats 0~3, r can be directly obtained through the PRACH configuration type sent to the mobile phone by a base station; for preamble format 4, $r=N_{ID}^{cell} \bmod R$, or can be directly obtained through the PRACH configuration type sent to the mobile phone by a base station.

Figure 8:
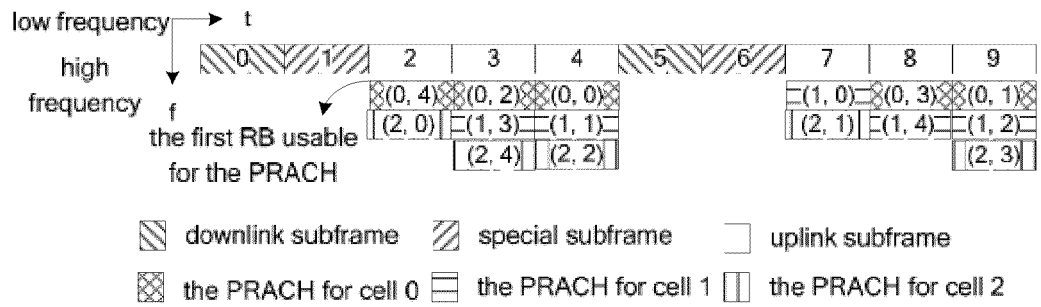
FIG. 8 shows Example 1 of the mapping result of Embodiment 11.
Figure 9:
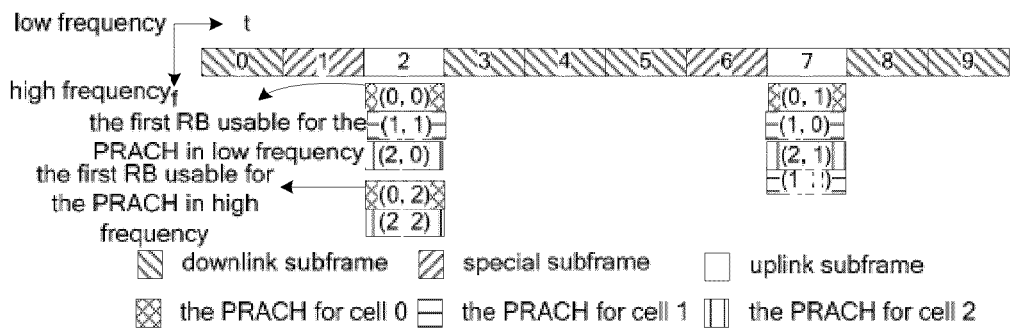
FIG. 9 shows Example 2 of the mapping result of Embodiment 11.

Based on the above mapping algorithm, if (r, d) represents the $d^{th}$ PRACH of version r, then:

(1) if R=3, D=5, the PRACH format is preamble format 0, D:U=1:3, then $N_{ind}^{RA}=0, 1, \ldots, 14$ respectively corresponds to (0, 0), (0, 1), (0, 2), (0, 3), (0, 4), (1, 0), (1, 1), (1, 2), (1, 3), (1, 4), (2, 0), (2, 1), (2, 2), (2, 3), (2, 4), the mapping results of time and frequency domain location are shown in FIG. 8. Wherein (0, 0), (1, 1), (2, 2) have the same frequency domain location; (0, 2), (1, 3), (2, 4) have the same frequency domain location; (0, 4), (2, 0) have the same frequency domain location; (0, 1), (1, 2), (2, 3) have the same frequency domain location; (0, 3), (1, 4) have the same frequency domain location; (1, 0), (2, 1) have the same frequency domain location;

(2) if R=3, D=3, the PRACH format is preamble format 0, D:U=3:1, then $N_{ind}^{RA}=0, 1, \ldots, 8$ respectively corresponds to (0, 0), (0, 1), (0, 2), (1, 0), (1, 1), (1, 2), (2, 0), (2, 1), (2, 2), the mapping results of time and frequency domain location are shown in FIG. 9; wherein (0, 0), (1, 1), (2, 0) have the same frequency domain location; (0, 2), (2, 2) have the same frequency domain location.

Embodiment 12

It is assumed that the density of the PRACHs is D (D can be 0.5, 1, 2, 3, 4, 5, 6 or 10 PRACH/10 ms); the number of versions is R; the serial number is $N_{ind}^{RA}=0, 1, \ldots, R\lceil D \rceil - 1$; the index of the usable PRACH in a random access period for a certain cell is d (which can be referred to as intra-cell PRACH index or density index, d=0, 1, ..., $\lceil D \rceil - 1$); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$ PRACH numbering: upon numbering, the density index is first incremented, then the version number is incremented, i.e., $N_{ind}^{RA}=r\lceil D \rceil + d$, wherein $N_{ind}^{RA}=0, 1, \ldots, R\lceil D \rceil - 1$, d=0, 1, ..., $\lceil D \rceil - 1$, r∈[0,R−1].

Frequency Domain Mapping
For Preamble Format 4

According to the serial number ($N_{ind}^{RA}$) in the increasing order, the PRACHs are mapped from low frequency to high frequency in the usable frequency resource, one PRACH occupies 6 RBs, the frequency bands occupied by two adjacent PRACHs in the frequency domain do not overlap.

For Preamble Formats 0~3

According to the $N_{ind}^{RA}$ in the increasing order, the PRACHs with the same version number r are mapped from the two sides to the middle of the usable frequency resource.

It is assumed that there are W PRACHs with version number r mapped to these L subframes, which are re-numbered as w=0, 1, 2, ..., W−1 according to the $N_{ind}^{RA}$ in the increasing order, the mapping method is that the PRACHs with even numbers are mapped from low frequency to high frequency in the usable frequency band, while the PRACHs with odd numbers are mapped from high frequency to low frequency in the usable frequency band, and one PRACH occupies 6 RBs, and the frequency bands occupied by two adjacent PRACHs in the frequency domain do not overlap. The same mapping process is used for each version number r.

The mapping principle mentioned above can be expressed by the following formulae:

$$N_{ind}^{RA} = r\lceil D \rceil + d$$

$$N_{ind}^{'RA} = \left\lfloor \frac{N_{ind}^{RA}}{\alpha + 1} \right\rfloor$$

-continued $$M_{ind}^{RA} = N_{ind}^{\prime RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right)L$$

$$f_{LRA}^r(t_{RA}^0, t_{RA}^1, t_{RA}^2) = 0, 1, \ldots, N_{RA}^r(t_{RA}^0, t_{RA}^1, t_{RA}^2) - 1$$

$$f_{SRA} = \left\lfloor \frac{N_{RA}^{\prime ind}}{\sum_{i=0}^{N_{SP}-1} N_{RA}^{HF}(i)} \right\rfloor$$

$$\alpha = (2D) \bmod 2$$

$$d = 0, 1, \ldots, \lceil D \rceil - 1, D \text{ basedon signal}$$

where $$N_{RA}^{HF}(i) = \left\lfloor \frac{N_{sub\text{-}frame}^{UL,HF}(i)}{L} \right\rfloor$$

L is number of ULsub-framesfor PRACH $$i = \begin{cases} 0, & 1st \text{ half frame} \\ 1, & 2nd \text{ half frame} \end{cases}$$

wherein (1) $f_{SRA}$ denotes the frequency domain mapping index of preamble format 4 (the serial number of the PRACH in the frequency domain), the particular location in the frequency domain can be $k_{RA} = k'_{RA} + f_{SRA} \cdot 6$, $k'_{RA}$ denotes the location of the first RB usable for the PRACH in the frequency domain;

(2) $f_{LRA}^r(t_{RA}^0, t_{RA}^1, t_{RA}^2)$ denotes the frequency domain mapping index of preamble formats 0~3 (the serial number of the PRACH in the frequency domain), which implies the frequency domain channel numbers of all PRACHs, of which the version numbers are r and the time domain locations are determined by $(t_{RA}^0, t_{RA}^1, t_{RA}^2)$. The mapping relationship between the serial number and the particular starting RB of the PRACHs in the frequency domain is $$k_{RA} \begin{cases} k'_{RA} + 6\left\lfloor \frac{f_{LRA}^r(t_{RA}^0, t_{RA}^1, t_{RA}^2)}{2} \right\rfloor, & f_{LRA}^r(t_{RA}^0, t_{RA}^1, t_{RA}^2) \bmod 2 = 0 \\ N_{RB}^{UL} - 6 - k'_{RA} - 6\left\lfloor \frac{f_{LRA}^r(t_{RA}^0, t_{RA}^1, t_{RA}^2)}{2} \right\rfloor, & \text{otherwise,} \end{cases}$$

$k'_{RA}$ denotes the location of the first RB usable for the PRACH in low frequency, $N_{RB}^{UL}$ denotes the total number of uplink resource blocks.

(3) denotes the number of all PRACHs, of which the version numbers are r and the time domain locations are determined by $(t_{RA}^0, t_{RA}^1, t_{RA}^2)$;

(4) for preamble formats 0~3, L denotes the number of the uplink subframes occupied by the PRACHs of this format, $N_{sub\text{-}frame}^{UL,HF}(i)$ denotes the number of the uplink subframes in a half frame; for preamble format 4, L=1, $N_{sub\text{-}frame}^{UL,HF}(i)$ denotes the number of the UpPTS in a half frame, i=0 indicates the first half frame, i=1 indicates the second half frame;

(5) through the PRACH configuration type sent to the mobile phone by a base station, R can be determined based on the number of the versions of the combination of the preamble format in the PRACH configuration set and the density;

(6) the version number r can be directly obtained through the PRACH configuration type sent to the mobile phone by a base station.

Embodiment 13

It is assumed that the density of the PRACHs is D (D can be 0.5, 1, 2, 3, 4, 5, 6 or 10 PRACH/10 ms); the number of versions is R; the serial number $N_{ind}^{RA}=0, 1, \ldots, R\lceil D \rceil-1$; the index of the usable PRACHs in a random access period for a certain cell is d (which can be referred to as intra-cell PRACH index or density index, d=0, 1, . . . , $\lceil D \rceil$–1); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the version number is first incremented, then the density index is incremented, i.e., $N_{ind}^{RA}=dR+r$, wherein $N_{ind}^{RA}=0, 1, \ldots, R\lceil D \rceil-1$, d=0, 1, . . . , $\lceil D \rceil$–1, r∈[0,R−1].

Frequency Domain Mapping

For Preamble Format 4

According to the serial number ($N_{ind}^{RA}$) in the increasing order, the PRACHs are mapped from low frequency to high frequency in the usable frequency resource, one PRACH occupies 6 RBs, and the frequency bands occupied by two adjacent PRACHs in the frequency domain do not overlap.

For Preamble Formats 0~3

According to the $N_{ind}^{RA}$ in the increasing order, the PRACHs with the same version number r are mapped from the two sides to the middle of the usable frequency resource.

It is assumed that there are W PRACHs with the version number r mapped to these L subframes, which are re-numbered as w=0, 1, 2, . . . , W−1 according to the $N_{ind}^{RA}$ in the increasing order, the mapping method is that the PRACHs with even numbers are mapped from low frequency to high frequency in the usable frequency band, while the PRACHs with odd numbers are mapped from high frequency to low frequency in the usable frequency band, and one PRACH occupies 6 RBs, and the frequency bands occupied by two adjacent PRACHs in the frequency domain do not overlap. The same mapping process is used for each version number r.

The mapping principle mentioned above can be expressed by the following formula:

$$N_{ind}^{RA} = dR + r$$

$$N_{ind}^{\prime RA} = \left\lfloor \frac{N_{ind}^{RA}}{\alpha + 1} \right\rfloor$$

$$M_{ind}^{RA} = N_{ind}^{\prime RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right)L$$

$$f_{LRA}^r(t_{RA}^0, t_{RA}^1, t_{RA}^2) = 0, 1, \ldots, N_{RA}^r(t_{RA}^0, t_{RA}^1, t_{RA}^2) - 1$$

$$f_{SRA} = \left\lfloor \frac{N_{RA}^{\prime ind}}{\sum_{i=0}^{N_{SP}-1} N_{RA}^{HF}(i)} \right\rfloor$$

-continued where $\alpha = (2D) \bmod 2$ $$r = \begin{cases} N_{ID}^{cell} \bmod R, & R = \left\lfloor \dfrac{N_{SRA}^{BW} \cdot N_{SP}}{D} \right\rfloor \\ & \text{for format4} \\ \text{based on signal,} & \text{for otherformats} \end{cases}$$

$d = 0, 1, \ldots, \lceil D \rceil - 1$, $D$ based on signal $$N_{RA}^{HF}(i) = \left\lfloor \dfrac{N_{sub\text{-}frame}^{UL,HF}(i)}{L} \right\rfloor$$

$L$ is number of $UL$ sub-frames for $PRACH$ $$i = \begin{cases} 0, & 1st \text{ half frame} \\ 1, & 2nd \text{ half frame} \end{cases}$$

wherein (1) $f_{SRA}$ denotes the frequency domain mapping index of preamble format 4 (the serial number of the PRACH in the frequency domain), the particular location in the frequency domain can be $k_{RA} = k'_{RA} + f_{SRA} \cdot 6$, $k'_{RA}$ denotes the location of the first RB usable for the PRACH in the frequency domain;

(2) $f_{LRA}^r(t_{RA}^0, t_{RA}^1, t_{RA}^2)$ denotes the frequency domain mapping index of preamble formats 0~3 (the serial number of the PRACH in the frequency domain), which implies the frequency domain channel numbers of all PRACHs, of which the version numbers are r and the time domain locations are determined by $(t_{RA}^0, t_{RA}^1, t_{RA}^2)$. The mapping relationship between the serial number and the particular starting RB of the PRACHs in the frequency domain is $$k_{RA} = \begin{cases} k'_{RA} + 6 \left\lfloor \dfrac{f_{LRA}^r(t_{RA}^0, t_{RA}^1, t_{RA}^2)}{2} \right\rfloor, & f_{LRA}^r(t_{RA}^0, t_{RA}^1, t_{RA}^2) \bmod 2 = 0 \\ N_{RB}^{UL} - 6 - k'_{RA} - 6 \left\lfloor \dfrac{f_{LRA}^r(t_{RA}^0, t_{RA}^1, t_{RA}^2)}{2} \right\rfloor, & \text{otherwise,} \end{cases}$$

$k'_{RA}$ denotes the location of the first RB usable for the PRACH in the low frequency, $N_{RB}^{UL}$ denotes the total number of uplink resource blocks.

(3) $N_{RA}^r(t_{RA}^0, t_{RA}^1, t_{RA}^2)$ denotes the number of all PRACHs, of which the version numbers are r and the time domain locations are determined by $(t_{RA}^0, t_{RA}^1, t_{RA}^2)$ (4) for preamble formats 0~3, L denotes the number of the uplink subframes occupied by the PRACHs of this format, $N_{sub\text{-}frame}^{UL,HF}(i)$ denotes the number of the uplink subframes in a half frame; for preamble format 4, L=1, $N_{sub\text{-}frame}^{UL,HF}(i)$ denotes the number of the UpPTS in a half frame, i=0 indicates the first half frame, i=1 indicates the second half frame;

(5) for preamble formats 0~3, through the PRACH configuration type sent to the mobile phone by a base station, R can be determined based on the number of the versions of the combination of the preamble format in the PRACH configuration set and the density; for preamble format 4, $$R = \left\lfloor \dfrac{N_{SRA}^{BW} \cdot N_{SP}}{D} \right\rfloor,$$

$N_{SRA}^{BW}$ denotes the number of the PRACHs that can be contained in the current system bandwidth in the frequency domain;

(6) for preamble formats 0~3, r can be directly obtained through the PRACH configuration type sent to the mobile phone by a base station; for preamble format 4, $r = N_{ID}^{cell} \bmod R$.

Embodiment 14

It is assumed that the density of the PRACHs is D (D can be 0.5, 1, 2, 3, 4, 5, 6 or 10 PRACH/10 ms); the number of versions is R; the serial number is $N_{ind}^{RA} = 0, 1, \ldots, R\lceil D \rceil - 1$; the index of the usable PRACHs in a random access period for a certain cell is d (which can be referred to as intra-cell PRACH index or density index, $d = 0, 1, \ldots, \lceil D \rceil - 1$); the version number is r ($r \in [0, R-1]$); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the version number is first incremented, then the density index is incremented, i.e., $N_{ind}^{RA} = dR + r$, wherein $N_{ind}^{RA} = 0, 1, \ldots, R\lceil D \rceil - 1$, $d = 0, 1, \ldots, \lceil D \rceil - 1$, $r \in [0, R-1]$.

Frequency Domain Mapping

For Preamble Format 4

According to the serial number ($N_{ind}^{RA}$) in the increasing order, the PRACHs are mapped from low frequency to high frequency in the usable frequency resource, one PRACH occupies 6 RBs, the frequency bands occupied by two adjacent PRACHs in the frequency domain do not overlap.

For Preamble Formats 0~3

According to the $N_{ind}^{RA}$ in the increasing order, the PRACHs with the same version number r are mapped from the two sides to the middle of the usable frequency resource.

It is assumed that there are W PRACHs with version number r mapped to these L subframes, which are re-numbered as $w = 0, 1, 2, \ldots, W-1$ according to the $N_{ind}^{RA}$ in the increasing order, the mapping method is that the PRACHs with even numbers are mapped from low frequency to high frequency in the usable frequency band, while the PRACHs with odd numbers are mapped from high frequency to low frequency in the usable frequency band, and one PRACH occupies 6 RBs, the frequency bands occupied by two adjacent PRACHs in the frequency domain do not overlap. The same mapping process is used for each version number r.

The mapping principle mentioned above can be expressed by the following formulae:

$$N_{ind}^{RA} = dR + r$$

$$N'^{RA}_{ind} = \left\lfloor \dfrac{N_{ind}^{RA}}{\alpha + 1} \right\rfloor$$

$$M_{ind}^{RA} = N'^{RA}_{ind} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left( \left\lfloor \dfrac{M_{ind}^{RA}}{N_{SP}} \right\rfloor + 1 \right) L$$

$$f_{LRA}^r(t_{RA}^0, t_{RA}^1, t_{RA}^2) = 0, 1, \ldots, N_{RA}^r(t_{RA}^0, t_{RA}^1, t_{RA}^2) - 1$$

$$f_{SRA} = \left\lfloor \dfrac{N'^{ind}_{RA}}{\sum_{i=0}^{N_{SP}-1} N_{RA}^{HF}(i)} \right\rfloor$$

-continued where $\alpha = (2D) \bmod 2$ $d = 0, 1, \ldots, \lceil D \rceil - 1$, D based on signal $$N_{RA}^{HF}(i) = \left\lfloor \frac{N_{sub-frame}^{UL,HF}(i)}{L} \right\rfloor$$

L is number of UL sub-frames for PRACH $$i = \begin{cases} 0, & 1st \text{ half frame} \\ 1, & 2nd \text{ half frame} \end{cases}$$

wherein (1) $f_{SRA}$ denotes the frequency domain mapping index of preamble format 4 (the serial number of the PRACH in the frequency domain), the particular location in the frequency domain can be $k_{RA} = k'_{RA} + f_{SRA} \cdot 6$, $k'_{RA}$ denotes the location of the first RB usable for the PRACH in the frequency domain;

(2) $f_{LRA}^r(t_{RA}^0, t_{RA}^1, t_{RA}^2)$ denotes the frequency domain mapping index of preamble formats 0—3 (the serial number of the PRACH in the frequency domain), which implies the frequency domain channel numbers of all PRACHs, of which the version numbers are r and the time domain locations are determined by $(t_{RA}^0, t_{RA}^1, t_{RA}^2)$. The mapping relationship between the serial number and the particular starting RB of the PRACHs in the frequency domain can be:

$$k_{RA} = \begin{cases} k'_{RA} + 6 \left\lfloor \frac{f_{LRA}^r(t_{RA}^0, t_{RA}^1, t_{RA}^2)}{2} \right\rfloor, & f_{LRA}^r(t_{RA}^0, t_{RA}^1, t_{RA}^2) \bmod 2 = 0 \\ N_{RB}^{UL} - 6 - k'_{RA} - 6 \left\lfloor \frac{f_{LRA}^r(t_{RA}^0, t_{RA}^1, t_{RA}^2)}{2} \right\rfloor, & \text{otherwise}, \end{cases}$$

$k'_{RA}$ denotes the location of the first RB usable for the PRACH in low frequency, $N_{RB}^{UL}$ denotes the total number of uplink resource blocks.

3) $N_{RA}^r(t_{RA}^0, t_{RA}^1, t_{RA}^2)$ denotes the number of all PRACHs, of which the version numbers are r and the time domain locations are determined by $(t_{RA}^0, t_{RA}^1, t_{RA}^2)$;

(4) for preamble formats 0~3, L denotes the number of the uplink subframes occupied by the PRACHs of this format, $N_{sub-frame}^{UL,HF}(i)$ denotes the number of the uplink subframes in a half frame; for preamble format 4, L=1, $N_{sub-frame}^{UL,HF}(i)$ denotes the number of the UpPTS in a half frame, i=0 indicates the first half frame, i=1 indicates the second half frame;

(5) through the PRACH configuration type sent to the mobile phone by a base station, R can be determined based on the number of the versions of the combination of the preamble format in the PRACH configuration set and the density;

(6) version number r can be directly obtained through the PRACH configuration type sent to the mobile phone by a base station.

Embodiment 15

It is assumed that the density of the PRACHs is D (D can be 0.5, 1, 2, 3, 4, 5, 6 or 10 PRACH/10 ms); the number of versions is R; the serial number is $N_{ind}^{RA}=0, 1, \ldots, R\lceil D \rceil - 1$; the index of the usable PRACHs in a random access period for a certain cell is d (which can be referred to as intra-cell PRACH index or density index, d=0, 1, ..., $\lceil D \rceil - 1$); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the density index is first incremented, then the version number is incremented, i.e., $N_{ind}^{RA}=r\lceil D \rceil + d$, wherein $N_{ind}^{RA}=0, 1, \ldots, R\lceil D \rceil - 1, d=0, 1, \ldots, \lceil D \rceil - 1$, r∈[0,R−1].

Frequency Domain Mapping

For Preamble Format 4

According to the serial number ($N_{ind}^{RA}$) in the increasing order, PRACHs are mapped from low frequency to high frequency in the usable frequency resource, one PRACH occupies 6 RBs, the frequency bands occupied by two adjacent PRACHs in the frequency domain do not overlap.

For Preamble Formats 0~3

According to the $N_{ind}^{RA}$ in the increasing order, the PRACHs with the same version number r are mapped from the two sides to the middle of the usable frequency resource.

It is assumed that there are W PRACHs with the version number r mapped to these L subframes, which are re-numbered as w=0, 1, 2, ..., W−1 according to the $N_{ind}^{RA}$ in the increasing order, then the mapping method is that the PRACHs with even numbers are mapped from low frequency to high frequency in the usable frequency band, while the PRACHs with odd numbers are mapped from high frequency to low frequency in the usable frequency band, and one PRACH occupies 6 RBs, and the frequency bands occupied by two adjacent PRACHs in the frequency domain do not overlap. The same mapping process is used for each version number r.

Embodiment 16

It is assumed that the density of the PRACHs is D (D can be 0.5, 1, 2, 3, 4, 5, 6 or 10 PRACH/10 ms); the number of versions is R; the serial number is $N_{ind}^{RA}=0, 1, \ldots, \lceil D \rceil - 1$; the index of the usable PRACHs in a random access period for a certain cell is d (which can be referred to as intra-cell PRACH index or density index, d=0, 1, ..., $\lceil D \rceil - 1$); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the density index is first incremented, then the version number is incremented, i.e., $N_{ind}^{RA}=r\lceil D \rceil + d$, wherein $N_{ind}^{RA}=0, 1, \ldots, R\lceil D \rceil - 1, d=0, 1, \ldots, \lceil D \rceil - 1$, r∈[0,R−1].

Frequency Domain Mapping

For preamble format 0~4

According to the $N_{ind}^{RA}$ in the increasing order, the PRACHs with the same version number r are mapped from the two sides to the middle of the usable frequency resource.

It is assumed that there are W PRACHs with the version number r mapped to these L subframes, which are re-numbered as w=0, 1, 2, ..., W−1 according to the $N_{ind}^{RA}$ in the increasing order, then the mapping method is that the PRACHs with even numbers are mapped from low frequency to high frequency in the usable frequency band, while the PRACHs with odd numbers are mapped from high frequency to low frequency in the usable frequency band, and one PRACH occupies 6 RBs, the frequency bands occupied by two adjacent PRACHs in the frequency domain do not overlap. The same mapping process is used for each version number r.

The mapping principle mentioned above can be expressed by the following formulae:

$$N_{ind}^{RA} = r\lceil D\rceil + d$$

$$N'^{RA}_{ind} = \left\lfloor \frac{N_{ind}^{RA}}{\alpha+1} \right\rfloor$$

$$M_{ind}^{RA} = N'^{RA}_{ind} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right)L$$

$$f_{RA}^r(t_{RA}^0, t_{RA}^1, t_{RA}^2) = 0, 1, \ldots, N_{RA}^r(t_{RA}^0, t_{RA}^1, t_{RA}^2) - 1$$

where $$\alpha = (2D)\bmod 2$$

$$r = \begin{cases} N_{ID}^{cell} \bmod R, & R = \left\lfloor \frac{N_{SRA}^{BW} \cdot N_{SP}}{D} \right\rfloor \\ & \text{for format4} \\ \text{basedon signal,} & \text{for } \textit{otherformats} \end{cases}$$

$$d = 0, 1, \ldots, \lceil D\rceil - 1, \text{ Dbasedon signal}$$

$$N_{RA}^{HF}(i) = \left\lfloor \frac{N_{sub\text{-}frame}^{UL,HF}(i)}{L} \right\rfloor$$

L is number of ULsub-framesforPRACH $$i = \begin{cases} 0, & 1st \text{ half frame} \\ 1, & 2nd \text{ half frame} \end{cases}$$

wherein (1) $f_{LRA}^r(t_{RA}^0, t_{RA}^1, t_{RA}^2)$ denotes the frequency domain mapping index of preamble formats 0—4 (the serial number of the PRACH in the frequency domain), which implies the frequency domain channel numbers of all PRACHs, of which the version numbers are r and the time domain locations are determined by $(t_{RA}^0, t_{RA}^1, t_{RA}^2)$. The mapping relationship between the serial number and the particular starting RB of the PRACHs in the frequency domain is $$k_{RA} = \begin{cases} k'_{RA} + 6\left\lfloor \frac{f_{LRA}^r(t_{RA}^0, t_{RA}^1, t_{RA}^2)}{2} \right\rfloor, & f_{LRA}^r(t_{RA}^0, t_{RA}^1, t_{RA}^2)\bmod 2 = 0 \\ N_{RB}^{UL} - 6 - k'_{RA} - 6\left\lfloor \frac{f_{LRA}^r(t_{RA}^0, t_{RA}^1, t_{RA}^2)}{2} \right\rfloor, & \text{otherwise,} \end{cases}$$

$k'^{RA}$ denotes the location of the first RB usable for the PRACH in low frequency, $N_{RB}^{UL}$ denotes the total number of uplink resource blocks.

(2) $N_{RA}^r(t_{RA}^0, t_{RA}^1, t_{RA}^2)$ denotes the number of all PRACHs, of which the version numbers are r and the time domain locations are determined by $t_{RA}^0, t_{RA}^1, t_{RA}^2$);

(2) $N_{RA}^r(t_{RA}^0, t_{RA}^1, t_{RA}^2)$ denotes the number of all PRACHs, of which the version indexes are r and the time domain locations are determined by $(t_{RA}^0, t_{RA}^1, t_{RA}^2)$;

(3) for preamble formats 0~3, L denotes the number of the uplink subframes occupied by the PRACHs of this format, $N_{sub\text{-}frame}^{UL,HF}(i)$ denotes the number of the uplink subframes in a half frame; for preamble format 4, L=1, $N_{sub\text{-}frame}^{UL,HF}(i)$ denotes the number of the UpPTS in a half frame, i=0 indicates the first half frame, i=1 indicates the second half frame;

(4) for preamble formats 0~3, through the PRACH configuration type sent to the mobile phone by a base station, R can be determined based on the number of the versions of the combination of the preamble format in the PRACH configuration set and the density; for preamble format 4, $$R = \left\lfloor \frac{N_{SRA}^{BW} \cdot N_{SP}}{D} \right\rfloor,$$

$N_{SRA}^{BW}$ denotes the number of the PRACHs that can be contained in the current system bandwidth in the frequency domain;

(5) for preamble formats 0~3, r can be directly obtained through the PRACH configuration type sent to the mobile phone by a base station; for preamble format 4, $r=N_{ID}^{cell} \bmod R$.

Embodiment 17

It is assumed that the density of the PRACHs is D (D can be 0.5, 1, 2, 3, 4, 5, 6 or 10 PRACH/10 ms); the number of versions is R; the serial number $N_{ind}^{RA}=0, 1, \ldots, R\lceil D\rceil-1$; the index of the usable PRACH in a random access period for a certain cell is d (which can be referred to as intra-cell PRACH index or density index, d=0, 1, . . . , $\lceil D\rceil-1$); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the density index is first incremented, then the version number is incremented, i.e., $N_{ind}^{RA}=r\lceil D\rceil+d$, wherein $N_{ind}^{RA}=0, 1, \ldots, R\lceil D\rceil-1$, d=0, 1, . . . , $\lceil D\rceil-1$, r∈[0,R−1].

Frequency Domain Mapping

For preamble format 0~4

According to the $N_{ind}^{RA}$ in the increasing order, the PRACHs with the same version number r are mapped from the two sides to the middle of the usable frequency resource.

It is assumed that there are W PRACHs with the version number r mapped to these L subframes, which are re-numbered as w=0, 1, 2, . . . , W−1 according to the $N_{ind}^{RA}$ in the increasing order, the mapping method is that the PRACHs with even numbers are mapped from low frequency to high frequency in the usable frequency band, while the PRACHs with odd numbers are mapped from high frequency to low frequency in the usable frequency band, and one PRACH occupies 6 RBs, the frequency bands occupied by two adjacent PRACHs in the frequency domain do not overlap. The same mapping process is used for each version number r.

The mapping principle mentioned above can be expressed by the following formulae:

$$N_{ind}^{RA} = r\lceil D\rceil + d$$

$$N'^{RA}_{ind} = \left\lfloor \frac{N_{ind}^{RA}}{\alpha+1} \right\rfloor$$

$$M_{ind}^{RA} = N'^{RA}_{ind} \bmod \sum_{i=0}^{N_{SP}-1} N_{RA}^{HF}(i)$$

$$t_0^{RA} = \alpha[(N_{ind}^{RA} \bmod 2) + 1]$$

-continued $$t_1^{RA} = M_{ind}^{RA} \bmod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right)L$$

$$f_{RA}^r(t_{RA}^0, t_{RA}^1, t_{RA}^2) = 0, 1, \ldots, N_{RA}^r(t_{RA}^0, t_{RA}^1, t_{RA}^2) - 1$$

where $$\alpha = (2D) \bmod 2$$

$$d = 0, 1, \ldots, \lceil D \rceil - 1, \quad D \text{ basedon signal}$$

$$N_{RA}^{HF}(i) = \left\lfloor \frac{N_{sub\text{-}frame}^{UL,HF}(i)}{L} \right\rfloor$$

L is number of ULsub-framesforPRACH $$i = \begin{cases} 0, & 1st \text{ half frame} \\ 1, & 2nd \text{ half frame} \end{cases}$$

wherein (1) $f_{RA}^r(t_{RA}^0, t_{RA}^1, t_{RA}^2)$ denotes the frequency domain mapping index of preamble formats 0—3 (the serial number of the PRACH in the frequency domain), which implies the frequency domain channel numbers of all PRACHs, of which the version numbers are r and the time domain locations are determined by $(t_{RA}^0, t_{RA}^1, t_{RA}^2)$. The mapping relationship between the serial number and the particular starting RB of the PRACHs in the frequency domain is $$k_{RA} = \begin{cases} k'_{RA} + 6\left\lfloor \frac{f_{LRA}^r(t_{RA}^0, t_{RA}^1, t_{RA}^2)}{2} \right\rfloor, & f_{LRA}^r(t_{RA}^0, t_{RA}^1, t_{RA}^2) \bmod 2 = 0 \\ N_{RB}^{UL} - 6 - k'_{RA} - 6\left\lfloor \frac{f_{LRA}^r(t_{RA}^0, t_{RA}^1, t_{RA}^2)}{2} \right\rfloor, & \text{otherwise,} \end{cases}$$

$k'_{RA}$ denotes the location of the first RB usable for the PRACH in low frequency, $N_{RB}^{UL}$ denotes the total number of uplink resource blocks.

(2) $N_{RA}^r(t_{RA}^0, t_{RA}^1, t_{RA}^2)$ denotes the number of all PRACHs, of which the version numbers are r and the time domain locations are determined by $(t_{RA}^0, t_{RA}^1, t_{RA}^2)$;

(3) for preamble formats 0~3, L denotes the number of the uplink subframes occupied by the PRACHs of this format, $N_{sub\text{-}frame}^{UL,HF}(i)$ denotes the number of the uplink subframes in a half frame; for preamble format 4, L=1, $N_{sub\text{-}frame}^{UL,HF}(i)$ denotes the number of the UpPTS in a half frame, i=0 indicates the first half frame, i=1 indicates the second half frame;

(4) through the PRACH configuration type sent to the mobile phone by a base station, R can be determined based on the number of the versions of the combination of the preamble format in the PRACH configuration set and the density;

(5) r can be directly obtained through the PRACH configuration type sent to the mobile phone by a base station.

Embodiment 18

It is assumed that the density of the PRACHs is D (D can be 0.5, 1, 2, 3, 4, 5, 6 or 10 PRACH/10 ms); the number of versions is R; the serial number is $N_{ind}^{RA}$=0, 1, ..., R[D]−1; the index of the usable PRACH in a random access period for a certain cell is d (which can be referred to as intra-cell PRACH index or density index, d=0, 1, ..., [D]−1); the version number is r (r∈[0,R−1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the version number is first incremented, then the density index is incremented, i.e., $N_{ind}^{RA}$=dR+r, wherein $N_{ind}^{RA}$=0, 1, ..., R[D]−1, d=0, 1, ..., [D]−1, r∈[0,R−1].

Frequency Domain Mapping

For preamble formats 0~4

According to the $N_{ind}^{RA}$ in the increasing order, the PRACHs with the same version number r can be mapped from the two sides to the middle of the usable frequency resource.

It is assumed that there are W PRACHs with the version number r mapped to these L subframes, which are re-numbered as w=0, 1, 2, ..., W−1 according to the $N_{ind}^{RA}$ in the increasing order, the mapping method is that the PRACHs with even numbers are mapped from low frequency to high frequency in the usable frequency band, while the PRACHs with odd numbers are mapped from high frequency to low frequency in the usable frequency band, and one PRACH occupies 6 RBs, and the frequency bands occupied by two adjacent PRACHs in the frequency domain do not overlap. The same mapping process is used for each version number r.

The mapping principle mentioned above can be expressed by the following formulae:

$$N_{ind}^{RA} = dR + r$$

$$N_{ind}^{\prime RA} = \left\lfloor \frac{N_{ind}^{RA}}{\alpha + 1} \right\rfloor$$

$$M_{ind}^{RA} = N_{ind}^{\prime RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right)L$$

$$f_{RA}^r(t_{RA}^0, t_{RA}^1, t_{RA}^2) = 0, 1, \ldots, N_{RA}^r(t_{RA}^0, t_{RA}^1, t_{RA}^2) - 1$$

where $$\alpha = (2D) \bmod 2$$

$$r = \begin{cases} N_{ID}^{cell} \bmod R, & R = \left\lfloor \frac{N_{SRA}^{BW} \cdot N_{SP}}{D} \right\rfloor \\ & \text{for format4} \\ \text{basedon signal,} & \text{for other formats} \end{cases}$$

$$d = 0, 1, \ldots, \lceil D \rceil - 1, \quad D \text{ basedon signal}$$

$$N_{RA}^{HF}(i) = \left\lfloor \frac{N_{sub\text{-}frame}^{UL,HF}(i)}{L} \right\rfloor$$

L is number of ULsub-framesforPRACH $$i = \begin{cases} 0, & 1st \text{ half frame} \\ 1, & 2nd \text{ half frame} \end{cases}$$

wherein (1) $f_{RA}^r(t_{RA}^0, t_{RA}^1, t_{RA}^2)$ denotes the frequency domain mapping index of preamble formats 0~3 (the serial number of the PRACH in the frequency domain), which implies the frequency domain channel numbers of all PRACHs, of which the version numbers are r and the time domain locations are determined by $(t_{RA}^0, t_{RA}^1, t_{RA}^2)$. The mapping relationship between the serial number and the particular starting RB of the PRACHs in the frequency domain can be $$k_{RA} = \begin{cases} k'_{RA} + 6\left\lfloor \dfrac{f^r_{LRA}(t^0_{RA}, t^1_{RA}, t^2_{RA})}{2} \right\rfloor, & f^r_{LRA}(t^0_{RA}, t^1_{RA}, t^2_{RA}) \bmod 2 = 0 \\ N^{UL}_{RB} - 6 - k'_{RA} - 6\left\lfloor \dfrac{f^r_{LRA}(t^0_{RA}, t^1_{RA}, t^2_{RA})}{2} \right\rfloor, & \text{otherwise,} \end{cases}$$

$k'_{RA}$ is the location of the first RB usable for the PRACH in low frequency, N denotes the total number of uplink resource blocks.

(2) $N_{RA}^r (t_{RA}^0, t_{RA}^1, t_{RA}^2)$ denotes the number of all PRACHs, of which the version numbers are r and the time domain locations are determined by $(t_{RA}^0, t_{RA}^1, t_{RA}^2)$;

(3) for preamble formats 0~3, L denotes the number of the uplink subframes occupied by the PRACHs of this format, $N_{sub\text{-}frame}^{UL,HF}(i)$ denotes the number of the uplink subframes in a half frame; for preamble format 4, L=1, $N_{sub\text{-}frame}^{UL,HF}(i)$ denotes the number of the UpPTS in a half frame, i=0 indicates the first half frame, i=1 indicates the second half frame;

(4) for preamble formats 0~3, through the PRACH configuration type sent to the mobile phone by a base station, R can be determined based on the number of the versions of the combination of the preamble format in the PRACH configuration set and the density; for preamble format 4, $$R = \left\lfloor \dfrac{N_{SRA}^{BW} \cdot N_{SP}}{D} \right\rfloor,$$

$N_{SRA}^{BW}$ denotes the number of the PRACHs that can be contained in the current system bandwidth in the frequency domain;

(5) for preamble formats 0~3, r can be directly obtained through the PRACH configuration type sent to the mobile phone by a base station; for preamble format 4, $r = N_{ID}^{cell} \bmod R$.

Embodiment 19

It is assumed that the density of the PRACHs is D (D can be 0.5, 1, 2, 3, 4, 5, 6, or 10 PRACH/10 ms); the number of versions is R; the serial number $N_{ind}^{RA}=0, 1, \ldots, R\lceil D \rceil-1$; the index of the usable PRACH in a random access period for a certain cell is d (which can be referred to as intra-cell PRACH index or density index, d=0, 1, ..., $R\lceil D \rceil-1$); the version number is r (r∈[0,R-1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the version number is first incremented, then the density index is incremented, i.e., $N_{ind}^{RA}=dR+r$, wherein $N_{ind}^{RA}=0, 1, \ldots, R\lceil D \rceil-1$, d=0, 1, ..., $\lceil D \rceil-1$, r∈[0,R-1].

Frequency Domain Mapping

For preamble formats 0~4

According to the $N_{ind}^{RA}$ in the increasing order, the PRACHs with the same version number are mapped from the two sides to the middle of the usable frequency resource.

It is assumed that there are W PRACHs with the version number r mapped to these L subframes, which are re-numbered as w=0, 1, 2, ..., W-1 according to the $N_{ind}^{RA}$ in the increasing order, then the mapping method is that the PRACHs with even numbers are mapped from low frequency to high frequency in the usable frequency band, while the PRACHs with odd numbers are mapped from high frequency to low frequency in the usable frequency band, and one PRACH occupies 6 RBs, and the frequency bands occupied by two adjacent PRACHs in the frequency domain do not overlap. The same mapping process is used for each version number r.

The mapping principle mentioned above can be expressed by the following formulae:

$$N_{ind}^{RA} = dR + r$$

$$N_{ind}'^{RA} = \left\lfloor \dfrac{N_{ind}^{RA}}{\alpha + 1} \right\rfloor$$

$$M_{ind}^{RA} = N_{ind}'^{RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left(\left\lfloor \dfrac{M_{ind}^{RA}}{N_{SP}} \right\rfloor + 1\right)L$$

$$f_{RA}^r(t_{RA}^0, t_{RA}^1, t_{RA}^2) = 0, 1, \ldots, N_{RA}^r(t_{RA}^0, t_{RA}^1, t_{RA}^2) - 1$$

where $$\alpha = (2D) \bmod 2$$

$$d = 0, 1, \ldots, \lceil D \rceil - 1, \quad D \text{ basedon signal}$$

$$N_{RA}^{HF}(i) = \left\lfloor \dfrac{N_{sub\text{-}frame}^{UL,HF}(i)}{L} \right\rfloor$$

L is number of ULsub-framesforPRACH $$i = \begin{cases} 0, & 1st \text{ half frame} \\ 1, & 2nd \text{ half frame} \end{cases}$$

wherein (1) $f_{RA}^r(t_{RA}^0, t_{RA}^1, t_{RA}^2)$ denotes the frequency domain mapping index of preamble formats 0—3 (the serial number of the PRACH in the frequency domain), which implies the frequency domain channel numbers of all PRACHs, of which the version numbers are r and the time domain locations are determined by $(t_{RA}^0, t_{RA}^1, t_{RA}^2)$. The mapping relationship between the serial number and the particular starting RB of the PRACHs in the frequency domain is $$k_{RA} = \begin{cases} k'_{RA} + 6\left\lfloor \dfrac{f^r_{LRA}(t^0_{RA}, t^1_{RA}, t^2_{RA})}{2} \right\rfloor, & f^r_{LRA}(t^0_{RA}, t^1_{RA}, t^2_{RA}) \bmod 2 = 0 \\ N^{UL}_{RB} - 6 - k'_{RA} - 6\left\lfloor \dfrac{f^r_{LRA}(t^0_{RA}, t^1_{RA}, t^2_{RA})}{2} \right\rfloor, & \text{otherwise,} \end{cases}$$

$k'_{RA}$ denotes the location of the first RB usable for the PRACH in low frequency, $N_{RB}^{UL}$ denotes the total number of uplink resource blocks.

(2) $N_{RA}^r(t_{RA}^0, t_{RA}^1, t_{RA}^2)$ denotes the number of all PRACHs, of which the version numbers are r and the time domain locations are determined by $(t_{RA}^0, t_{RA}^1, t_{RA}^2)$;

(3) for preamble formats 0~3, L denotes the number of the uplink subframes occupied by the PRACHs of this format, $N_{sub\text{-}frame}^{UL,HF}(i)$ denotes the number of the uplink subframes in a half frame; for preamble format 4, L=1, $N_{sub\text{-}frame}^{UL,HF}(i)$ denotes the number of the UpPTS in a half frame, i=0 indicates the first half frame, i=1 indicates the second half frame;

(4) through the PRACH configuration type sent to the mobile phone by a base station, R can be determined based on the number of the versions of the combination of the preamble format in the PRACH configuration set and the density;

(5) version number r can be directly obtained through the PRACH configuration type sent to the mobile phone by a base station.

Embodiment 20

It is assumed that the density of the PRACHs is D (D can be 0.5, 1, 2, 3, 4, 5, 6, or 10 PRACH/10 ms); the number of versions is R; the serial number denotes $N_{ind}^{RA}=0, 1, \ldots, R\lceil D\rceil-1$; the index of the usable PRACHs in a random access period for a certain cell is d (which can be referred to as intra-cell PRACH index or density index, $d=0, 1, \ldots, \lceil D\rceil-1$); the version number is r ($r\in[0, R-1]$); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the density index is first incremented, then the version number is incremented, i.e., $N_{ind}^{RA}=r\lceil D\rceil+d$, wherein $N_{ind}^{RA}=0, 1, \ldots, R\lceil D\rceil-1$, $d=0, 1, \ldots, \lceil D\rceil-1$, $r\in[0,R-1]$.

Frequency Domain Mapping

For preamble formats 0~4

According to the $N_{ind}^{RA}$ in the increasing order, the PRACHs with the same version number r are mapped from the two sides to the middle of the usable frequency resource.

It is assumed that there are W PRACHs with version number r mapped to these L subframes, which are re-numbered as $w=0, 1, 2, \ldots, W-1$ according to the $N_{ind}^{RA}$ in the increasing order, then the mapping method is that the PRACHs with even numbers are mapped from low frequency to high frequency in the usable frequency band, while the PRACHs with odd numbers are mapped from high frequency to low frequency in the usable frequency band, and one PRACH occupies 6 RBs, and the frequency bands occupied by two adjacent PRACHs in the frequency domain do not overlap. The same mapping process is used for each version number r.

Embodiment 21

It is assumed that the density of the PRACHs is D (D can be 0.5, 1, 2, 3, 4, 5, 6 or 10 PRACH/10 ms); the number of versions is R; the serial number denotes $N_{ind}^{RA}=0, 1, \ldots, R\lceil D\rceil-1$; the index of the usable PRACH in a random access period for a certain cell is d (which can be referred to as intra-cell PRACH index or density index, $d=0, 1, \ldots, \lceil D\rceil-1$); the version number is r ($r\in[0,R-1]$); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the density index is first incremented, then the version number is incremented, i.e., $N_{ind}^{RA}=r\lceil D\rceil+d$, wherein $N_{ind}^{RA}=0, 1, \ldots, R\lceil D\rceil-1$, $d=0$ $\mu 1, \ldots, \lceil D\rceil-1$, $r\in[0, R-1]$.

Frequency Domain Mapping

For preamble formats 0~4

According to the $N_{ind}^{RA}$ in the increasing order, the PRACHs with the same version number r are mapped from the two sides to the middle of the usable frequency resource.

It is assumed that there are W PRACHs with version number r mapped to these L subframes, which are re-numbered as $w=0, 1, 2, \ldots, W-1$ according to the $N_{ind}^{RA}$ in the increasing order, the mapping method is that the PRACHs with even numbers are mapped from low frequency to high frequency in the usable frequency band, while the PRACHs with odd numbers are mapped from high frequency to low frequency in the usable frequency band, and one PRACH occupies 6 RBs, the frequency bands occupied by two adjacent PRACHs in the frequency domain do not overlap. The same mapping process is used for each version number r.

The mapping principle mentioned above can be expressed by the following formulae:

$$N_{ind}^{RA} = r\lceil D\rceil + d$$

$$N_{ind}'^{RA} = \left\lfloor \frac{N_{ind}^{RA}}{\alpha+1} \right\rfloor$$

$$M_{ind}^{RA} = N_{ind}'^{RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub\text{-}frame}^{UL,HF}(t_1^{RA}) - \left(\left\lfloor \frac{M_{ind}^{RA}}{N_{SP}} \right\rfloor + 1\right) L$$

$$f_{RA}^r(t_{RA}^0, t_{RA}^1, t_{RA}^2) = 0, 1, \ldots, N_{RA}^r(t_{RA}^0, t_{RA}^1, t_{RA}^2) - 1$$

$$\alpha = (2D) \bmod 2$$

$$r = \begin{cases} N_{ID}^{cell} \bmod R, & R = \left\lfloor \frac{N_{SRA}^{BW} \cdot N_{SP}}{D} \right\rfloor \\ & \text{for format4} \\ based on\ signal, & \text{for } other formats \end{cases}$$

where $d = 0, 1, \ldots, \lceil D\rceil - 1$, $D$ $based on$ signal $$N_{RA}^{HF}(i) = \left\lfloor \frac{N_{sub\text{-}frame}^{UL,HF}(i)}{L} \right\rfloor$$

L is number of $UL sub\text{-}frames for PRACH$ $$i = \begin{cases} 0, & 1st\ \text{half frame} \\ 1, & 2nd\ \text{half frame} \end{cases}$$

wherein (1) $f_{RA}^r(t_{RA}^0, t_{RA}^1, t_{RA}^2)$ denotes the frequency domain mapping index of preamble formats 0~4 (the serial number of the PRACH in the frequency domain), which implies the frequency domain channel numbers of all PRACHs, of which the version numbers are r and the time domain locations are determined by $(t_{RA}^0, t_{RA}^1, t_{RA}^2)$. The mapping relationship between the serial number and the particular starting RB of the PRACHs in the frequency domain is $$k_{RA} = \begin{cases} k_{RA}' + 6\left\lfloor \frac{f_{LRA}^r(t_{RA}^0, t_{RA}^1, t_{RA}^2)}{2} \right\rfloor, & f_{LRA}^r(t_{RA}^0, t_{RA}^1, t_{RA}^2) \bmod 2 = 0 \\ N_{RB}^{UL} - 6 - k_{RA}' - 6\left\lfloor \frac{f_{LRA}^r(t_{RA}^0, t_{RA}^1, t_{RA}^2)}{2} \right\rfloor, & \text{otherwise,} \end{cases}$$

$k'_{RA}$ denotes the location of the first RB usable for the PRACH in low frequency, $N_{RB}^{UL}$ denotes the total number of uplink resource blocks.

(2) $N_{RA}^r(t_{RA}^0, t_{RA}^1, t_{RA}^2)$ denotes the number of all PRACHs, of which the version numbers are r and the time domain locations are determined by $(t_{RA}^0, t_{RA}^1, t_{RA}^2)$;

(3) for preamble formats 0~3, L denotes the number of the uplink subframes occupied by the PRACHs of this format, $N_{sub\text{-}frame}^{UL,HF}(i)$ denotes the number of the uplink subframes in a half frame; for preamble format 4, L=1, $N_{sub\text{-}frame}^{UL,HF}(i)$ denotes the number of the UpPTS in a half frame, i=0 indicates the first half frame, i=1 indicates the second half frame;

(4) for preamble formats 0~3, through the PRACH configuration type sent to the mobile phone by a base station, R can be determined based on the number of the versions of the combination of the preamble format in the PRACH configuration set and the density; for preamble format 4, R is fixed at 3, $N_{SRA}^{BW}$ the number of the PRACHs that can be contained in the current system bandwidth in the frequency domain;

(5) for preamble formats 0~3, r can be directly obtained through the PRACH configuration type sent to the mobile phone by a base station; for preamble format 4, r=$N_{ID}^{cell}$ mod R, or can be directly obtained through the PRACH configuration type sent to the mobile phone by a base station.

Embodiment 22

It is assumed that the density of the PRACHs is D (D can be 0.5, 1, 2, 3, 4, 5, 6 or 10 PRACH/10 ms); the number of versions is R; the serial number $N_{ind}^{RA}$=0, 1, ..., R⌈D⌉-1; the index of the usable PRACH in a random access period for a certain cell is d (which can be referred to as intra-cell PRACH index or density index, d=0, 1, ..., ⌈D⌉-1); the version number is r (r∈[0, R-1]); the number of downlink-to-uplink conversion points in a 10 ms radio frame is $N_{SP}$; the number of the PRACHs of a certain format contained in a half frame in the time domain is $N_{RA}^{HF}(i)$.

PRACH numbering: upon numbering, the density index is first incremented, then the version number is incremented, i.e., $N_{ind}^{RA}$=r⌈D⌉+d, wherein $N_{ind}^{RA}$=0, 1, ..., R⌈D⌉-1, d=0, 1, ..., ⌈D⌉-1, r∈[0, R-1].

Frequency Domain Mapping

For Preamble Format 4

It is assumed that there are W PRACHs mapped to a certain UpPTS, which are re-numbered as w=0, 1, 2, ..., W-1 according to the serial number ($N_{ind}^{RA}$) in the increasing order, the mapping method can be: the PRACHs with even numbers are mapped from low frequency to high frequency in a usable frequency band, while the PRACHs with odd numbers are mapped from high frequency to low frequency, and one PRACH occupies 6 RBs, and the frequency bands occupied by two adjacent PRACHs in the frequency domain do not overlap.

For Preamble Formats 0~3

According to the serial number ($N_{ind}^{RA}$) in the increasing order, the PRACHs with the same version number r can be mapped from the two sides to the middle of the usable frequency resource.

It is assumed that there are W PRACHs with version number r mapped to these L subframes, which are re-numbered as w=0, 1, 2, ..., W-1 according to the serial number ($N_{ind}^{RA}$) in the increasing order, the mapping method is that the PRACHs with even numbers are mapped from low frequency to high frequency in a usable frequency band, while the PRACHs with odd numbers are mapped from high frequency to low frequency in the usable frequency band, and one PRACH occupies 6 RBs, and the frequency bands occupied by two adjacent PRACHs in the frequency domain do not overlap. The same mapping process is used for each version number r.

The mapping principle mentioned above can be expressed by the following formulae:

$$N_{RA}^{ind} = r\lceil D \rceil + d$$

$$N_{RA}^{\prime ind} = \left\lfloor \frac{N_{RA}^{ind}}{\alpha + 1} \right\rfloor$$

$$M_{RA}^{ind} = N_{RA}^{\prime ind} \bmod \sum_{i=0}^{N_{SP}-1} N_{RA}^{HF}(i)$$

$$t_{RA}^0 = \alpha[(N_{RA}^{ind} \bmod 2) + 1]$$

$$t_{RA}^1 = M_{RA}^{ind} \bmod N_{SP}$$

$$t_{RA}^2 = N_{sub\text{-}frame}^{UL,HF}(t_{RA}^1) - \left(\left\lfloor \frac{M_{RA}^{ind}}{N_{SP}} \right\rfloor + 1\right)L$$

$$f_{LRA}^r(t_{RA}^0, t_{RA}^1, t_{RA}^2) = 0, 1, \ldots, N_{LRA}^r(t_{RA}^0, t_{RA}^1, t_{RA}^2) - 1$$

$$f_{SRA} = \left\lfloor \frac{N_{RA}^{\prime ind}}{\sum_{i=0}^{N_{SP}-1} N_{RA}^{HF}(i)} \right\rfloor$$

$$\alpha = (2D) \bmod 2$$

$$r = \begin{cases} N_{ID}^{cell} \bmod R, & R = \left\lfloor \frac{N_{RA}^{BW} \cdot N_{SP}}{D} \right\rfloor \\ & \text{for format 4} \\ based on \text{ signal,} & \text{for } other formats \end{cases}$$

where $d = 0, 1, \ldots, \lceil D \rceil - 1$, $D$ based on signal $$N_{RA}^{HF}(i) = \left\lfloor \frac{N_{sub\text{-}frame}^{UL,HF}(i)}{L} \right\rfloor$$

$L$ is number of $UL$ sub-frames for PRACH $$i = \begin{cases} 0, & 1st \text{ half frame} \\ 1, & 2nd \text{ half frame} \end{cases}$$

wherein (1) $f_{SRA}$ denotes the frequency domain mapping index of preamble format 4 (the serial number of the PRACH in the frequency domain), which is equivalent to $f_{SRA}(t_{RA}^0, t_{RA}^1, t_{RA}^2)$=0, 1, ..., $N_{SRA}(t_{RA}^0, t_{RA}^1, t_{RA}^2)$-1, i.e., the result of renumbering all of the PRACHs, of which the time domain locations are determined by $(t_{RA}^0, t_{RA}^1, t_{RA}^2)$, according to the serial number $N_{ind}^{RA}$ in the increasing order. The mapping relationship between the serial number and the particular starting RB of the PRACHs in the frequency domain can be $$k_{RA} = \begin{cases} k_{RA}' + 6\left\lfloor \frac{f_{SRA}}{2} \right\rfloor, & f_{SRA} \bmod 2 = 0 \\ N_{RB}^{UL} - 6 - k_{RA}' - 6\left\lfloor \frac{f_{SRA}}{2} \right\rfloor, & \text{otherwise,} \end{cases}$$

$k'_{RA}$ denotes the location of the first RB usable for the PRACH in low frequency, $N_{RB}^{UL}$ denotes the total number of uplink resource blocks;

(2) $f_{LRA}^r(t_{RA}^0, t_{RA}^1, t_{RA}^2)$ denotes the frequency domain mapping index of preamble formats 0~3 (the serial number of the PRACH in the frequency domain), which means the result of renumbering all of the PRACHs, of which the version numbers are r and the time domain locations are determined by $(t_{RA}^0, t_{RA}^1, t_{RA}^2)$, according to the serial number ($N_{ind}^{RA}$) in the increasing order. The mapping relationship between the serial number and the particular starting RB of the PRACHs in the particular frequency domain is $$k_{RA} = \begin{cases} k'_{RA} + 6\left\lfloor \dfrac{f^r_{LRA}(t^0_{RA}, t^1_{RA}, t^2_{RA})}{2} \right\rfloor, & f^r_{LRA}(t^0_{RA}, t^1_{RA}, t^2_{RA}) \bmod 2 = 0 \\ N^{UL}_{RB} - 6 - k'_{RA} - 6\left\lfloor \dfrac{f^r_{LRA}(t^0_{RA}, t^1_{RA}, t^2_{RA})}{2} \right\rfloor, & \text{otherwise,} \end{cases}$$

$k'_{RA}$ denotes the location of the first RB usable for the PRACH in low frequency, $N_{RB}^{UL}$ denotes the total number of the uplink resource blocks.

(3) $N_{RA}^r(t_{RA}^0, t_{RA}^1, t_{RA}^2)$ denotes the number of all PRACHs (preamble formats 0~3), of which the version numbers are r and the time domain locations are determined by $(t_{RA}^0, t_{RA}^1, t_{RA}^2)$; $N_{SRA}(t_{RA}^0, t_{RA}^1, t_{RA}^2)$ denotes the number of all PRACHs (preamble format 4), of which the time domain locations are determined by $(t_{RA}^0, t_{RA}^1, t_{RA}^2)$;

(4) for preamble formats 0~3, L denotes the number of the uplink subframes occupied by the PRACHs of this format, $N_{sub-frame}^{UL,HF}(i)$ denotes the number of the uplink subframes in a half frame; for preamble format 4, L=1, $N_{sub-frame}^{UL,HF}(i)$ denotes the number of the UpPTS in a half frame, i=0 indicates the first half frame, i=1 indicates the second half frame;

(5) for preamble formats 0~3, through the PRACH configuration type sent to the mobile phone by a base station, R can be determined based on the number of the versions of the combination of the preamble format in the PRACH configuration set and the density; for preamble format 4, $$R = \left\lfloor \dfrac{N_{RA}^{BW} \cdot N_{SP}}{D} \right\rfloor,$$

$N_{SRA}^{BW}$ the number of the PRACHs that can be contained in the frequency domain in the current system bandwidth; or $$R = \min\left(\left\lfloor \dfrac{N_{RA}^{BW} \cdot N_{SP}}{D} \right\rfloor, 3\right);$$

or it can be determined through the PRACH configuration type sent to the mobile phone by a base station, based on the number of the versions of the combination of the preamble format in the PRACH configuration set and the density;

(6) for preamble formats 0~3, r can be directly obtained through the PRACH configuration type sent to the mobile phone by a base station; for preamble format 4, $r = N_{ID}^{cell} \bmod R$, or can be directly obtained through the PRACH configuration type sent to the mobile phone by a base station.

Embodiment 23

It is assumed that the density of the PRACHs is D (D can be 0.5, 1, 2, 3, 4, 5, 6 or 10 PRACH/10 ms); the number of versions is R; the PRACH number $N_{ind}^{RA} = 0, 1, \ldots, R\lceil D\rceil - 1$; the index of the usable PRACHs in a random access period for a certain cell is d (which can be referred to as intra-cell PRACH index or density index, $d = 0, 1, \ldots, \lceil D\rceil - 1$); the version number is r ($r \in [0, R-1]$); the number of downlink-to-uplink conversion points in a 10 ms radio frame is $N_{SP}$; the number of PRACHs of a certain format contained in the time domain of a half frame is $N_{RA}^{HF}(i)$.

PRACH numbering: upon numbering, the version number is first incremented, then the density index is incremented, i.e., $N_{ind}^{RA} = dR + r$, wherein $N_{ind}^{RA} = 0, 1, \ldots, R\lceil D\rceil - 1$, $d = 0, 1, \ldots, \lceil D\rceil - 1$, $r \in [0, R-1]$.

Frequency Domain Mapping

For Preamble Format 4

If there are W PRACHs mapped to a certain UpPTS, and the W PRACHs are re-numbered as $w = 0, 1, 2, \ldots, W-1$ according to the serial number $N_{ind}^{RA}$ in the increasing order, the mapping method can be:

the PRACHs with even numbers are mapped from low frequency to high frequency in the usable frequency band, while the PRACHs with odd numbers are mapped from high frequency to low frequency in the usable frequency band, and one PRACH occupies 6 RBs, and the frequency bands occupied by two adjacent PRACHs in the frequency domain do not overlap.

For Preamble Formats 0~3

According to the serial number ($N_{ind}^{RA}$) in the increasing order, the PRACHs with the same version number r are mapped from the two sides to the middle of the usable frequency resource.

It is assumed that there are W PRACHs with version number r mapped to these L subframes, and the W PRACHs are re-numbered as $w = 0, 1, 2, \ldots, W-1$ according to the serial number $N_{ind}^{RA}$ in the increasing order, the mapping method is that the PRACHs with even numbers are mapped from low frequency to high frequency in the usable frequency band, while the PRACHs with odd numbers are mapped from high frequency to low frequency in the usable frequency band, and one PRACH occupies 6 RBs, the frequency bands occupied by two adjacent PRACHs in the frequency domain do not overlap. The same mapping process is used for each version number r.

The mapping principle mentioned above can be expressed by the following formulae:

$$N_{RA}^{ind} = dR + r$$

$$N_{ind}^{\prime RA} = \left\lfloor \dfrac{N_{ind}^{RA}}{\alpha + 1} \right\rfloor$$

$$M_{ind}^{RA} = N_{ind}^{\prime RA} \bmod \sum_{i=0}^{N_{SP}-1} N_{RA}^{HF}(i)$$

$$t_0^{RA} = \alpha[(N_{ind}^{RA} \bmod 2) + 1]$$

$$t_1^{RA} = M_{ind}^{RA} \bmod N_{SP}$$

$$t_2^{RA} = N_{sub-frame}^{UL,HF}(t_1^{RA}) - \left(\left\lfloor \dfrac{M_{ind}^{RA}}{N_{SP}} \right\rfloor + 1\right) L$$

$$f_{LRA}^r(t_{RA}^0, t_{RA}^1, t_{RA}^2) = 0, 1, \ldots, N_{LRA}^r(t_{RA}^0, t_{RA}^1, t_{RA}^2) - 1$$

$$f_{SRA} = \left\lfloor \dfrac{N_{RA}^{\prime ind}}{\sum_{i=0}^{N_{SP}-1} N_{RA}^{HF}(i)} \right\rfloor$$

$$\alpha = (2D) \bmod 2$$

$$r = \begin{cases} N_{ID}^{cell} \bmod R, & R = \left\lfloor \dfrac{N_{SRA}^{BW} \cdot N_{SP}}{D} \right\rfloor \\ & \text{for format 4} \\ \text{based on signal,} & \text{for other formats} \end{cases}$$

-continued where $d = 0, 1, \ldots, \lceil D \rceil - 1$, $D$ basedon signal $$N_{RA}^{HF}(i) = \left\lfloor \frac{N_{sub\text{-}frame}^{UL,HF}(i)}{L} \right\rfloor$$

$L$ is number of $UL$ sub-framesforPRACH $$i = \begin{cases} 0, & 1st \text{ half frame} \\ 1, & 2nd \text{ half frame} \end{cases}$$

wherein (1) $f_{SRA}$ denotes the frequency domain mapping index of preamble format 4 (the serial number of the PRACH in the frequency domain), which is equivalent to $f_{SRA}(t_{RA}^0, t_{RA}^1, t_{RA}^2) = 0, 1, \ldots, N_{SRA}(t_{RA}^0, t_{RA}^1, t_{RA}^2) - 1$, i.e., the result of renumbering all of the PRACHs, of which the time domain locations are determined by $(t_{RA}^0, t_{RA}^1, t_{RA}^2)$, according to the serial number ($N_{ind}^{RA}$) in the increasing order. The mapping relationship between the serial number and the particular starting RB of the PRACHs in the frequency domain can be $$k_{RA} = \begin{cases} k'_{RA} + 6 \left\lfloor \frac{f_{SRA}}{2} \right\rfloor, & f_{SRA} \bmod 2 = 0 \\ N_{RB}^{UL} - 6 - k'_{RA} - 6 \left\lfloor \frac{f_{SRA}}{2} \right\rfloor, & \text{otherwise,} \end{cases}$$

$k'_{RA}$ denotes the location of the first RB usable for the PRACH in low frequency, $N_{RB}^{UL}$ denotes the total number of uplink resource blocks;

(2) $f_{LRA}^r(t_{RA}^0, t_{RA}^1, t_{RA}^2)$ denotes the frequency domain mapping index of preamble formats 0~3 (the serial number of the PRACH in the frequency domain), i.e., the result of renumbering all of the PRACHs, of which the version index is r and the time domain locations are determined by $(t_{RA}^0, t_{RA}^1, t_{RA}^2)$, according to the serial number ($N_{ind}^{RA}$) in the increasing order. The mapping relationship between the serial number and the particular starting RB of the PRACHs in the frequency domain is $$k_{RA} = \begin{cases} k'_{RA} + 6 \left\lfloor \frac{f_{LRA}^r(t_{RA}^0, t_{RA}^1, t_{RA}^2)}{2} \right\rfloor, & f_{LRA}^r(t_{RA}^0, t_{RA}^1, t_{RA}^2) \bmod 2 = 0 \\ N_{RB}^{UL} - 6 - k'_{RA} - 6 \left\lfloor \frac{f_{LRA}^r(t_{RA}^0, t_{RA}^1, t_{RA}^2)}{2} \right\rfloor, & \text{otherwise,} \end{cases}$$

$k'_{RA}$ denotes the location of the first RB usable for the PRACH in low frequency, $N_{RB}^{UL}$ denotes the total number of the uplink resource blocks.

(3) $N_{RA}^r(t_{RA}^0, t_{RA}^1, t_{RA}^2)$ denotes the number of all PRACHs (preamble formats 0~3), of which the version numbers are r and the time domain locations are determined by $(t_{RA}^0, t_{RA}^1, t_{RA}^2)$; $N_{SRA}(t_{RA}^0, t_{RA}^1, t_{RA}^2)$ denotes the number of all PRACHs (preamble format 4), of which the time domain locations are determined by $(t_{RA}^0, t_{RA}^1, t_{RA}^2)$;

(4) for preamble formats 0~3, L denotes the number of the uplink subframes occupied by the PRACHs of this format, $N_{sub\text{-}frame}^{UL,HF}(i)$ denotes the number of the uplink subframes in a half frame; for preamble format 4, L=1, $N_{sub\text{-}frame}^{UL,HF}(i)$ denotes the number of the UpPTS in a half frame, i=0 indicates the first half frame, i=1 indicates the second half frame;

(5) for preamble formats 0~3, through the PRACH configuration type sent to the mobile phone by a base station, R can be determined based on the number of the versions of the combination of the preamble format in the PRACH configuration set and the density; for preamble format 4, $$R = \left\lfloor \frac{N_{RA}^{BW} \cdot N_{SP}}{D} \right\rfloor,$$

$N_{SRA}^{BW}$ denotes the number of PRACHs can be contained in the current system bandwidth in the frequency domain; or $$R = \min\left(\left\lfloor \frac{N_{RA}^{BW} \cdot N_{SP}}{D} \right\rfloor, 3\right);$$

or it can be determined through the PRACH configuration type sent to the mobile phone by a base station, based on the number of the versions of the combination of the preamble format in the PRACH configuration set and the density;

(6) for preamble formats 0~3, r can be directly obtained through the PRACH configuration type sent to the mobile phone by a base station; for preamble format 4, $r = N_{ID}^{cell} \bmod R$, or can be directly obtained through the PRACH configuration type sent to the mobile phone by a base station.

In the usable frequency resource, the PRACHs with the same version number r can be mapped from low frequency to high frequency according to the serial number $N_{ind}^{RA}$ in the increasing order, one PRACH occupies 6 RBs, and the frequency bands occupied by two adjacent PRACHs in the frequency domain do not overlap. The same mapping process is used for each version number r.

From the above description, it can be seen that the method for mapping PRACH of the present invention takes the factor of version number into account during the mapping process, thus it is solves the problems such as the PRACHs which need to be processed are distributed unevenly in the time domain, and further enables the PRACHs which need to be processed by the same base station to be distributed evenly in the time domain, and meanwhile reduces the inter-cell interference of the PRACHs of the second type to the greatest extent.

Obviously, those skilled in the art shall understand that individual modules and steps of the present invention can be implemented with general computation devices integrated together or distributed in the network formed by a plurality of computation devices, alternatively implemented with program codes executable by computation devices, which can be stored in memory devices for execution by the computation devices, or implemented with ICs, or several modules or steps can be implemented with a single IC. Thus, the present invention is not limited to any particular hardware and software combination.

Above description is to illustrate the preferred embodiments rather than limit the present invention. Various alterations and changes to the present invention are apparent to those skilled in the art. The scope defined in claims shall comprise any modification, equivalent substitution and improvement within the spirit and principle of the present invention.

We claim:

1. A method for mapping physical random access channel, PRACH, W PRACHs having the same time domain location, wherein the serial number of each PRACH is w=0, 1, 2, ..., W−1, characterized in that the method performed by a processor comprises:

mapping the PRACHs with even serial numbers from high frequency to low frequency, or from low frequency to high frequency in a usable frequency band, while mapping the PRACHs with odd serial numbers from low frequency to high frequency, or from high frequency to low frequency in the usable frequency band, and one PRACH occupies 6 continuous resource blocks, RBs, in the frequency domain, and the frequency bands occupied by two adjacent PRACHs in the frequency domain do not overlap, the same mapping process is used for each version number r; or mapping the first half $$\left(w \leq \left\lceil \frac{W}{2} \right\rceil, \text{ or } w < \left\lceil \frac{W}{2} \right\rceil, \text{ or } w \leq \left\lfloor \frac{W}{2} \right\rfloor, \text{ or } w < \left\lfloor \frac{W}{2} \right\rfloor \right)$$

of the PRACHs from high frequency to low frequency, or from low frequency to high frequency in the usable frequency band, while mapping the second half of the PRACHs from low frequency to high frequency, or from high frequency to low frequency in the usable frequency band, and one PRACH occupies 6 continuous RBs in the frequency domain, the frequency bands occupied by the two adjacent PRACHs in the frequency domain do not overlap, the same mapping process is used for each version number r; or mapping the PRACHs with even serial numbers from high frequency to low frequency, or from low frequency to high frequency in a usable frequency band, while mapping, the PRACHs with odd serial numbers from low frequency to high frequency, or from high frequency to low frequency in the usable frequency band, and one PRACH occupies 6 continuous RBs in the frequency domain, the frequency bands occupied by two adjacent PRACHs in the frequency domain do not overlap; or mapping the first half $$\left(w \leq \left\lceil \frac{W}{2} \right\rceil, \text{ or } w < \left\lceil \frac{W}{2} \right\rceil, \text{ or } w \leq \left\lfloor \frac{W}{2} \right\rfloor, \text{ or } w < \left\lfloor \frac{W}{2} \right\rfloor \right)$$

of the PRACHs from high frequency to low frequency, or from low frequency to high frequency in a usable frequency band, while mapping the second half of the PRACHs from low frequency to high frequency, or from high frequency to low frequency in the usable frequency band, and one PRACH occupies 6 continuous RBs in the frequency domain, the frequency bands occupied by two adjacent PRACHs in the frequency domain do not overlap.

2. The mapping method according to claim 1, characterized in that a version number is obtained through the following operation:

obtaining the version number r directly from the configuration type of the PRACH sent from a base station.

3. The mapping method according to claim 1, characterized in that for the PRACH with a format of preamble formats 0~3, the mapping formula for the mapping process in the frequency domain is:

$$k_{RA} = \begin{cases} k'_{RA} + 6 \left\lfloor \frac{f^r_{LRA}(t^0_{RA}, t^1_{RA}, t^2_{RA})}{2} \right\rfloor, & f^r_{LRA}(t^0_{RA}, t^1_{RA}, t^2_{RA}) \bmod 2 = 0 \\ N^{UL}_{RB} - 6 - k'_{RA} - 6 \left\lfloor \frac{f^r_{LRA}(t^0_{RA}, t^1_{RA}, t^2_{RA})}{2} \right\rfloor, & \text{otherwise} \end{cases}$$

wherein $k'_{RA}$ denotes the serial number of the first RB usable for the PRACH of low frequency, $N_{RB}^{UL}$ denotes the total number of RBs corresponding to uplink bandwidth, $f_{LRA}^{r}(t_{RA}^{0}, t_{RA}^{1}, t_{RA}^{2})$ denotes the frequency domain mapping index of preamble formats 0~3, i.e., the serial numbers of all PRACHs belonging to the same cell, with the version number r and the same time domain location which is determined by parameters $(t_{RA}^{0}, t_{RA}^{1}, t_{RA}^{2})$, $t_{RA}^{0}$ is used to indicate in which radio frame the PRACH resides;

$t_{RA}^{1}$ used to indicate in which half frame the PRACH resides;

$t_{RA}^{2}$ is used to indicate in which subframe in the half frame the PRACH resides.

* * * * *